(12) United States Patent
Fujita et al.

(10) Patent No.: US 8,456,400 B2
(45) Date of Patent: Jun. 4, 2013

(54) LIQUID CRYSTAL DEVICE AND ELECTRONIC APPARATUS

(75) Inventors: Shin Fujita, Suwa (JP); Tomotoshi Kato, Hashima (JP); Kengo Shiragami, Tottori (JP)

(73) Assignee: Japan Display West Inc., Aichi-Ken (JP)

( * ) Notice: Subject to any disclaimer, the term of this patent is extended or adjusted under 35 U.S.C. 154(b) by 1059 days.

(21) Appl. No.: 12/145,944

(22) Filed: Jun. 25, 2008

(65) Prior Publication Data

US 2009/0015533 A1 Jan. 15, 2009

(30) Foreign Application Priority Data

Jun. 29, 2007 (JP) ................................ 2007-171633

(51) Int. Cl.
*G09G 3/36* (2006.01)
(52) U.S. Cl.
USPC ............................................. 345/92; 345/90
(58) Field of Classification Search
USPC ...................................................... 345/92, 90
See application file for complete search history.

(56) References Cited

U.S. PATENT DOCUMENTS

| | | | | |
|---|---|---|---|---|
| 5,250,931 A * | 10/1993 | Misawa et al. | ................ | 345/206 |
| 2004/0041778 A1 * | 3/2004 | Hiraki et al. | .................. | 345/100 |
| 2005/0078078 A1 * | 4/2005 | Morita | .......................... | 345/100 |
| 2005/0146493 A1 * | 7/2005 | Kinjo et al. | ..................... | 345/89 |
| 2006/0132419 A1 * | 6/2006 | Morita | ............................. | 345/98 |
| 2006/0227096 A1 * | 10/2006 | Fujita | ............................ | 345/100 |

FOREIGN PATENT DOCUMENTS

| | | |
|---|---|---|
| JP | 07-104246 | 4/1995 |
| JP | 2001-194685 | 7/2001 |
| JP | A 2002-196358 | 7/2002 |
| JP | 2002-221941 | 8/2002 |
| JP | 2003-255907 | 9/2003 |
| JP | 2004-117608 | 4/2004 |
| JP | 2005-018077 | 1/2005 |
| JP | 2005-049849 | 2/2005 |
| JP | 2005-062396 | 3/2005 |
| JP | 2005-300948 | 10/2005 |
| JP | 2006-078920 | 3/2006 |
| JP | 2006-139298 | 6/2006 |

OTHER PUBLICATIONS

Japanese Patent Office, Notification of reasons for refusal issued in connection with Japanese Patent Application No. 2007-171634, dated Jul. 3, 2012. (3 pages).
Japanese Office Action issued Feb. 14, 2012, for corresponding Japanese Appln. No. 2007-171634.
Japanese Office Action issued Apr. 3, 2012, for corresponding Japanese Appln. No. 2007-171632.

* cited by examiner

*Primary Examiner* — Alexander S Beck
*Assistant Examiner* — Joseph Pena
(74) *Attorney, Agent, or Firm* — K&L Gates LLP

(57) ABSTRACT

A liquid crystal device including a plurality of scanning lines, a plurality of data lines, a plurality of pixel electrodes, a capacitor electrode, a control circuit, a scanning line driving circuit, and a data line driving circuit.

15 Claims, 14 Drawing Sheets

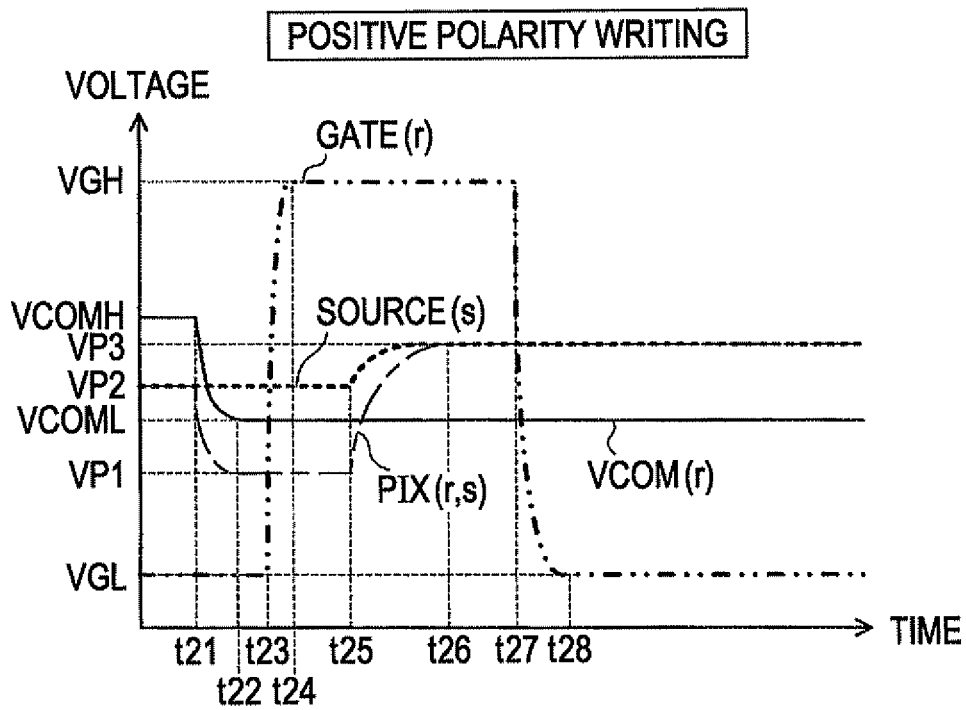
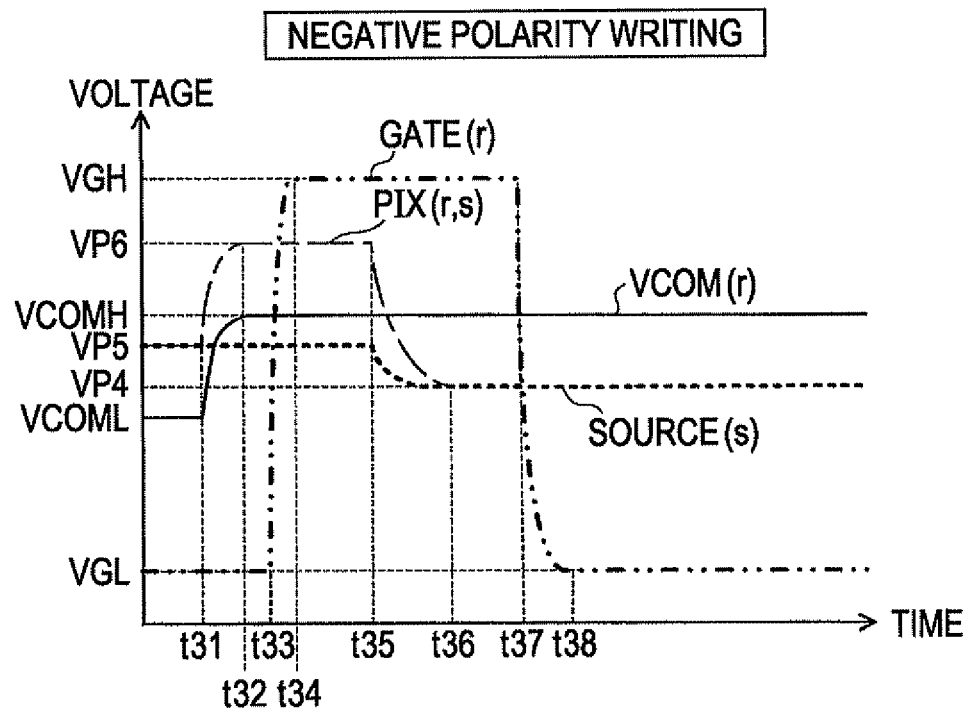

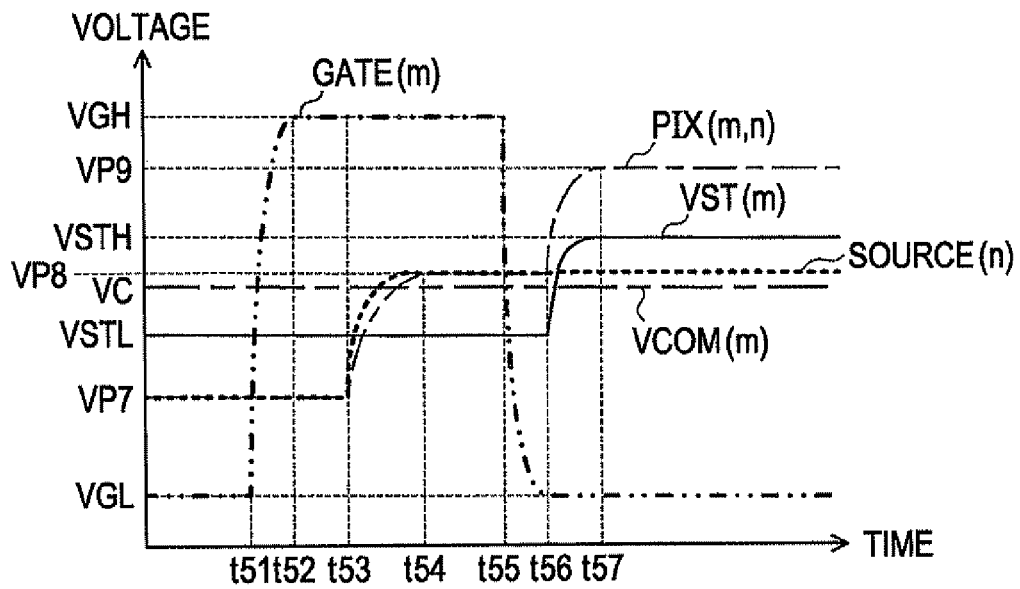
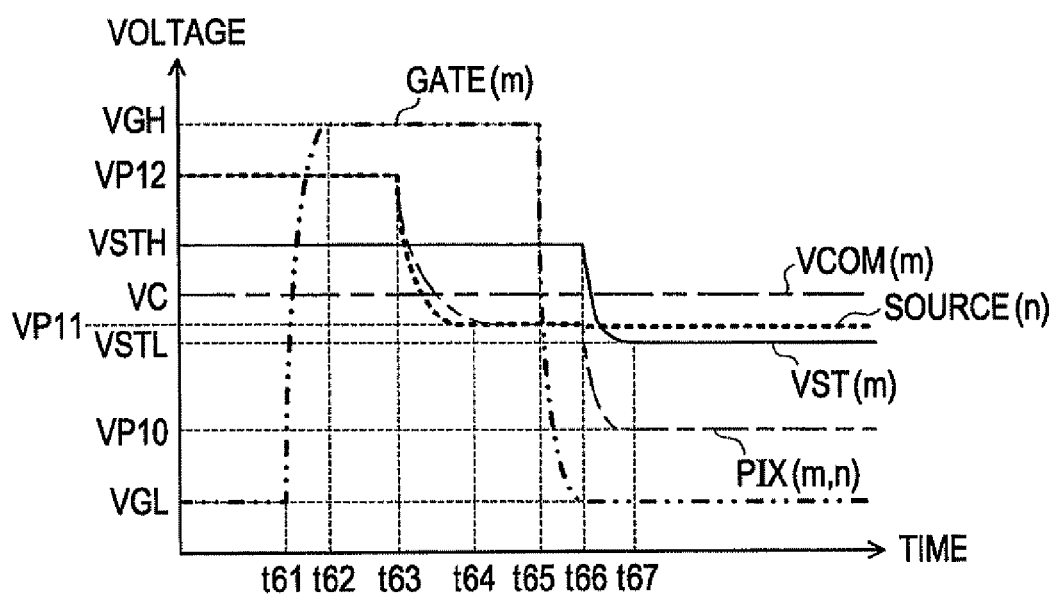

LIQUID CRYSTAL DEVICE AND ELECTRONIC APPARATUS

BACKGROUND

1. Technical Field

The present invention relates to a liquid crystal device and an electronic apparatus.

2. Related Art

A liquid crystal device has been known as a display device. The liquid crystal device is, for example, provided with a liquid crystal panel and a backlight that supplies light to the liquid crystal panel.

The liquid crystal panel includes an element substrate, an opposite substrate that is opposed to the element substrate, and a liquid crystal provided between the element substrate and the opposite substrate.

The element substrate includes a plurality of scanning lines and a plurality of auxiliary capacitor lines that are alternately provided at predetermined intervals, a plurality of data lines that intersect with the plurality of scanning lines and the plurality of auxiliary capacitor lines and that are provided at predetermined intervals, a scanning line driving circuit connected to the plurality of scanning lines, a data line driving circuit connected to the plurality of data lines, and a control circuit that is connected to the plurality of auxiliary capacitor lines and that drives the auxiliary capacitor lines.

Pixels are provided at positions corresponding to intersections of the scanning line and the data lines. Each of the pixels includes a pixel capacitor, a thin film transistor (hereinafter, referred to as TFT), and a storage capacitor (auxiliary capacitor). The pixel capacitor is formed of a pixel electrode and a common electrode. The thin film transistor serves as a switching element. One electrode (auxiliary capacitor electrode) of the storage capacitor is connected to the capacitor line and the other electrode is connected to the pixel electrode. The plurality of pixels are arranged in a matrix to form a display area.

The gate of the TFT is connected to the scanning line, the source of the TFT is connected to the data line and the drain of the TFT is connected to the pixel electrode and the other electrode of the auxiliary capacitor.

A capacitor line driving circuit supplies a predetermined voltage to each capacitor line.

The scanning line driving circuit supplies each scanning line with a selection voltage that selects the scanning line in a predetermined order. As a selection voltage is supplied to a scanning line, the TFTs connected to the scanning line all enter an on state.

The data line driving circuit supplies an image signal to each data line and writes an image voltage based on the image signal to the pixel electrode through the TFT, which is in an on state.

Here, the data line driving circuit alternately performs positive polarity writing and negative polarity writing. In the positive polarity writing, the data line driving circuit supplies the data lines with image signals of voltages that are higher in electric potential than the voltage of the common electrode (hereinafter, referred to as positive polarity) to thereby write the pixel electrodes with image voltages based on the positive polarity image signals. In the negative polarity writing, the data line driving circuit supplies the data lines with image signals of voltages that are lower in electric potential than the voltage of the common electrode (hereinafter, referred to as negative polarity) to thereby write the pixel electrodes with image voltages based on the negative polarity image signals.

The opposite substrate includes color filters, such as R (red), G (green) and B (blue), corresponding to the pixels.

The above described liquid crystal device operates as follows.

That is, by sequentially supplying a selection voltage to the scanning lines, all the TFTs connected to one scanning line are made to enter an on state to thereby select all the pixels associated with this scanning line. Then, in synchronization with selection of these pixels, image signals are supplied to the data lines. Then, image signals are supplied to all the selected pixels through the TFTs, which are in an on state, and image voltages based on the image signals are written to the pixel electrodes.

As the image voltage is written to the pixel electrode, a liquid crystal is applied with a driving voltage because of a difference in electric potential between the pixel electrode and the common electrode. As the driving voltage is applied to the liquid crystal, alignment and/or order of the liquid crystal change and, as a result, light emitted from a backlight and transmitted through the liquid crystal varies. Grayshade is performed in such a manner that the above varied light is transmitted through a color filter.

Note that the driving voltage applied to the liquid crystal is held, owing to an auxiliary capacitor, during a period of time that is three digits longer than a period of time during which an image voltage is being written.

Incidentally, the above described liquid crystal device is, for example, used for a cellular phone and, in recent years, there is a need for the cellular phone to reduce power consumption. Then, there has been proposed a liquid crystal device that is able to reduce power consumption by performing capacitor line swing driving, which is a so-called SSL (Swing Storage Line), in which, after an image voltage has been written to the pixel electrode, the TFT is made to enter an off state and, in addition, an auxiliary capacitor voltage (VST) of an auxiliary capacitor line is changed from a high electric potential (VSTH) to a low electric potential (VSTL) or changed from a low electric potential to a high electric potential, which is, for example, described in JP-A-2002-196358.

In addition, a lateral electric field mode liquid crystal device includes an IPS (In-Plane Switching) liquid crystal device or an FFS (Fringe-Field Switching) liquid crystal device, which is provided with pixel electrodes and a common electrode, which form pixel capacitors, formed on one of a pair of substrates that hold the liquid crystal. In the lateral electric field mode liquid crystal device, a common electrode (COM electrode) also serves as an auxiliary capacitor electrode and, then, a pixel capacitor and an auxiliary capacitor are integrally formed. A liquid crystal device, which has been proposed by the applicant of the present application, is able to reduce power consumption and also able to suppress deterioration of display quality in such a manner that the capacitor line swing driving in the lateral electric field mode, in which, after the common electrode has been supplied with a voltage having a high electric potential (VCOMH) or a voltage having a low electric potential (VCOML), a negative polarity image signal or a positive polarity image signal is supplied to the data line, is performed.

The circuit of the above described capacitor line swing driving or COM separate driving is formed on a glass substrate using a technology termed SOG (system on glass). In the above described circuit, in order to have an image display based on a positive polarity image signal or a negative polarity image signal reliably work using a transistor formed on the substrate, a power source that drives the transistor uses 8 V as a positive power source and −4 V as a negative power source, and a voltage Vgs between the gate and source of the transistor is 12 V at the maximum. Thus, the gate length (hereinafter, referred to as L length) of the transistor has been set to an L length of a size by which the Vgs 12 V may be used without any problem.

Here, because a capacitor line or a common line is influenced by a parasitic capacitance that is generated at a portion at which the capacitor line or the common line intersects with a data line, as a measure to crosstalk, it is desirable that a transistor that supplies the capacitor line or the common line with a high electric potential or a low electric potential has a low on resistance. However, when the maximum value of the Vgs is large, the L length of the transistor also needs to be increased. Thus, there has been a problem that the on resistance of the transistor increases as the L length increases. Furthermore, when the on resistance of the transistor is large and, therefore, a crosstalk becomes problematic, it is necessary to reduce the resistance of the circuit by increasing the width of the line connected to the transistor to reduce its resistance so as to prevent the occurrence of a crosstalk. Thus, the area of the circuit becomes large and, as a result, it has been an obstacle to a reduction in window frame region in which driving circuits are formed (around a pixel region) and/or a reduction in power consumption.

SUMMARY

An advantage of some aspects of the invention is that it provides a liquid crystal device which is provided with a pixel electrode and a capacitor electrode, which form a pixel capacitor, formed on one of a pair of substrates that hold a liquid crystal, wherein the liquid crystal device is capable of contributing to a reduction in the occurrence of a crosstalk and/or a reduction in the area of a circuit by achieving a low on resistance of a transistor used for capacitor line swing driving, and also provides an electronic apparatus provided with the liquid crystal device.

An aspect of the invention provides a liquid crystal device. The liquid crystal device (which corresponds to a liquid crystal device 1, 1A, or 1') includes a plurality of scanning lines (which correspond to scanning lines Y or Y' in the embodiments), a plurality of data lines (which correspond to data lines X or X' in the embodiments), a plurality of pixel electrodes (which correspond to pixel electrodes 55 or 55' in the embodiments), a capacitor electrode (which corresponds to a common electrode 56 or 56' or an auxiliary capacitor electrode 57'), a control circuit (which corresponds to a control circuit 30, 30A or 30' in the embodiments), a scanning line driving circuit (which corresponds to a scanning line driving circuit 10 or 10' in the embodiment), and a data line driving circuit (which corresponds to a data line driving circuit 20 or 20'). The plurality of data lines intersect with the scanning lines. The plurality of pixel electrodes are provided at positions corresponding to intersections of the plurality of scanning lines and the plurality of data lines. The capacitor electrode is provided opposite each of the pixel electrodes and forms a capacitor with each of the pixel electrodes or with an electrode layer connected to each of the pixel electrodes. The control circuit alternately supplies the capacitor electrode with a first voltage (which corresponds to VCOML or VSTL in the embodiments) or a second voltage (which corresponds to VCOMH or VSTH in the embodiments) that is higher in electric potential than the first voltage. The scanning line driving circuit sequentially supplies the plurality of scanning lines with a scanning line selection voltage that selects the scanning line. The data line driving circuit, when the scanning line is selected, alternately supplies the plurality of data lines with a positive polarity image signal that is higher in electric potential than the first voltage or a negative polarity image signal that is lower in electric potential than the second voltage. The control circuit includes a selection circuit (which corresponds to a selection circuit R or R' in the embodiments) and a selection signal output circuit (which corresponds to a latch circuit Q or Q' in the embodiments). The selection circuit alternately selects and outputs the first voltage or the second voltage to the capacitor electrode. The selection signal output circuit outputs a selection signal (a polarity control signal POL in the embodiments) to the selection circuit. The first voltage is higher in electric potential than a low electric potential of the selection signal. The second voltage is lower in electric potential than a high electric potential of the selection signal.

According to the above aspect of the invention, because the L length of each transistor that constitutes the selection circuit may be made short, it is possible to reduce the area of a circuit and, as a result, it is possible to contribute to a narrow window frame of the liquid crystal device. In addition, by reducing the L length, it is also possible to achieve a low on resistance and, therefore, it is possible to contribute to low power consumption.

In addition, in the aspect of the invention, the liquid crystal device may further include a pair of substrates that hold a liquid crystal, wherein the control circuit may be formed of transistors formed on any one of the substrates, and wherein a difference in electric potential between a gate and a source of each transistor (which corresponds to a first transfer gate 37, a second transfer gate 38, an N-channel Nch transfer gate RN or RN', or a P-channel Pch transfer gate RP or RP' in the embodiments) that constitutes the selection circuit may be set lower than a difference in electric potential between a gate and a source of each transistor (which corresponds to a first clocked inverter 34 or a second clocked inverter 35 in the embodiments) that constitutes the selection signal output circuit. Thus, because the L length of each transistor that constitutes the selection circuit may be made shorter than each transistor that constitutes the selection signal output circuit, it is possible to reduce the area of a circuit and, as a result, it is possible to contribute to a narrow window frame of the liquid crystal device. In addition, by reducing the L length, it is also possible to achieve a low on resistance and, therefore, it is possible to contribute to low power consumption.

In addition, in the aspect of the invention, the liquid crystal device may further include a pair of substrates that hold a liquid crystal, wherein the control circuit may be formed of transistors formed on any one of the substrates, and wherein a gate length of each transistor (which corresponds to a first transfer gate 37, a second transfer gate 38, an N-channel Nch transfer gate RN or RN' or a P-channel Pch transfer gate RP or RP' in the embodiments) that constitutes the selection circuit may be set shorter than a gate length of each transistor (which corresponds to a first clocked inverter 34 or a second clocked inverter 35 in the embodiments) that constitutes the selection signal output circuit.

In addition, in the aspect of the invention, the capacitor electrode may be a common electrode (which corresponds to a common electrode 56 or 56' in the embodiments). Furthermore, the liquid crystal device may be configured so that, after the control circuit supplies the first voltage (which corresponds to VCOML in the embodiments) to the common electrode, the scanning line driving circuit supplies the selection voltage to the scanning line and the data line driving circuit supplies the positive polarity image signals to the data lines, while, after the control circuit supplies the second voltage (which corresponds to VCOMH in the embodiments) to the common electrode, the scanning line driving circuit supplies the selection voltage to the scanning line and the data line driving circuit supplies the negative polarity image signals to the data lines. In this manner, after the first voltage is supplied to the common electrode, the positive polarity image signals are supplied to the data lines, while, after the second voltage is supplied to the common electrode, the negative polarity image signals are supplied to the data lines. Thus, a suitable configuration of a so-called COM separate driving mode liquid crystal device may be obtained.

In addition, in the aspect of the invention, the capacitor electrode may be an auxiliary capacitor electrode (which corresponds to a common electrode 56 or 56, or an auxiliary capacitor electrode 57' in the embodiments). Furthermore, the liquid crystal device may be configured so that, when the electric potentials of the data lines correspond to writing of positive polarity image signals in a case where the scanning line is set to an on electric potential, the control circuit supplies the auxiliary capacitor electrode with the second voltage (which corresponds to VSTH in the embodiments) after the scanning line is changed to an off electric potential, while, on the other hand, when the electric potentials of the data lines correspond to writing of negative polarity image signals in a case where the scanning line is set to an on electric potential, the control circuit supplies the auxiliary capacitor electrode with the first voltage (which corresponds to VSTL in the embodiments) after the scanning line is changed to an off electric potential. Thus, the suitable configuration of a so-called SSL driving mode liquid crystal device may be obtained.

In addition, an aspect of the invention provides an electronic apparatus having the above described liquid crystal device.

According to the aspect of the invention, the same advantageous effects as those described above are obtained.

BRIEF DESCRIPTION OF THE DRAWINGS

The invention will be described with reference to the accompanying drawings, wherein like numbers reference like elements.

FIG. 7 is a timing chart when the liquid crystal device performs positive polarity writing.

FIG. 8 is a timing chart when the liquid crystal device performs negative polarity writing.

FIG. 14 is a timing chart when the liquid crystal device performs positive polarity writing.

FIG. 15 is a timing chart when the liquid crystal device performs negative polarity writing.

DESCRIPTION OF EXEMPLARY EMBODIMENTS

Figure 1:
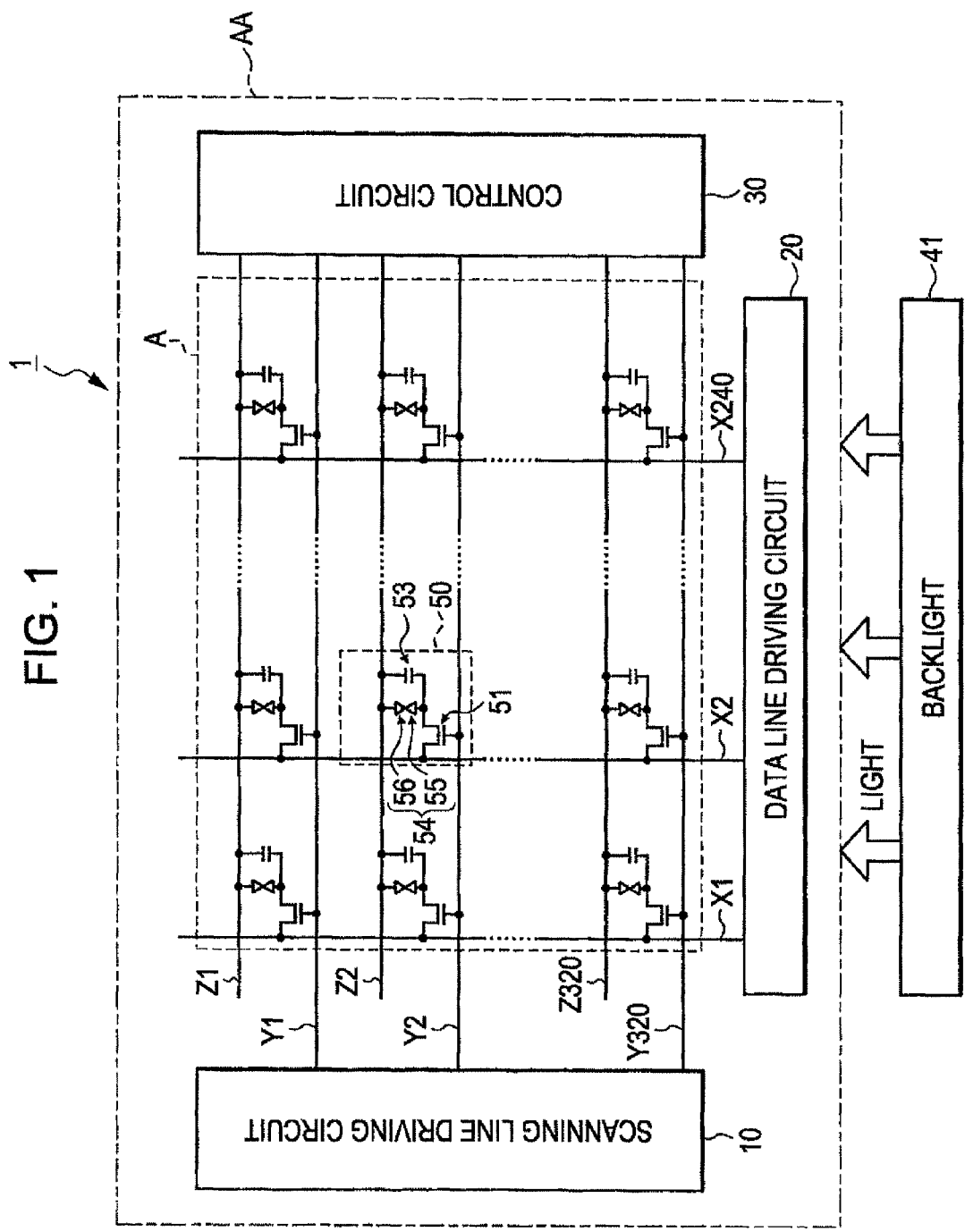
FIG. 1 is a block diagram of a liquid crystal device according to a first embodiment of the invention.

Hereinafter, embodiments of the invention will be described with reference to the accompanying drawings. Note that, when the following embodiments or alternative embodiments are described, the same reference numerals are assigned to the same components and the description thereof will be omitted or simplified.

Note that first to third embodiments illustrate examples of a lateral electric field mode liquid crystal device that employs COM separate driving, and a fourth embodiment illustrates an example of a vertical electric field mode liquid crystal device (a mode in which a liquid crystal is driven using a so-called vertical electric field generated between a pixel electrode and a common electrode that are respectively formed on the inner surfaces of a pair of substrates) that employs SSL driving.

First Embodiment

Example of COM Separate Driving

FIG. 1 is a block diagram of a lateral electric field mode liquid crystal device 1 that employs COM separate driving according to a first embodiment of the invention.

The liquid crystal device 1 includes a liquid crystal panel AA and a backlight 41 that is opposed to the liquid crystal panel AA and that emits light. The liquid crystal device 1 uses light from the backlight 41 to perform transmissive display.

The liquid crystal panel AA includes a display area A having a plurality of pixels 50, and also includes a scanning line driving circuit 10, a data line driving circuit 20 and a control circuit 30, which are provided around the display area A to drive the pixels 50.

The backlight 41 is provided on the rear face of the liquid crystal panel AA, and is, for example, formed of a cold cathode fluorescent lamp (CCFL), a LED (light emitting diode) or an electroluminescence (EL) and supplies light to the pixels 50 of the liquid crystal panel AA.

Hereinafter, the configuration of the liquid crystal panel AA will be described in detail.

The liquid crystal panel AA includes 320 rows of scanning lines Y (Y1 to Y320) and 320 rows of common lines Z (Z1 to Z320) that are alternately provided at predetermined intervals and also includes 240 columns of data lines X (X1 to X240) that are provided so as to intersect with the scanning lines Y (Y1 to Y320) and the common lines z (Z1 to Z320). The pixels 50 are provided at portions corresponding to intersections of the scanning lines Y and the data lines X.

Each of the pixels 50 includes a TFT 51, a pixel electrode 55, a common electrode 56, and a storage capacitor 53. The common electrode 56 is provided opposite the pixel electrode 55. The storage capacitor 53, which serves as an auxiliary capacitor, of which one electrode (auxiliary capacitor electrode) is connected to a corresponding one of the common lines Z and the other of which is connected to the pixel electrode 55 or an electrode layer connected to the pixel electrode 55. The pixel electrode 55 and the common electrode 56 form a pixel capacitor 54.

The common electrode 56 is separately provided in units of horizontal line in correspondence with the scanning line Y. The plurality of common electrodes 56, which are separately provided in units of horizontal line, are connected to the corresponding common lines Z, respectively.

The gate of the TFT 51 is connected to the scanning line Y, the source of the TFT 51 is connected to the data line X, and the drain of the TFT 51 is connected to the pixel electrode 55 and the other electrode of the storage capacitor 53. Thus, as a selection voltage is applied from the scanning line Y to the TFT 51, the TFT 51 enters an on state to thereby attain a conductive state between the data line X and both the pixel electrode 55 and the other electrode of the storage capacitor 53.

Figure 2:
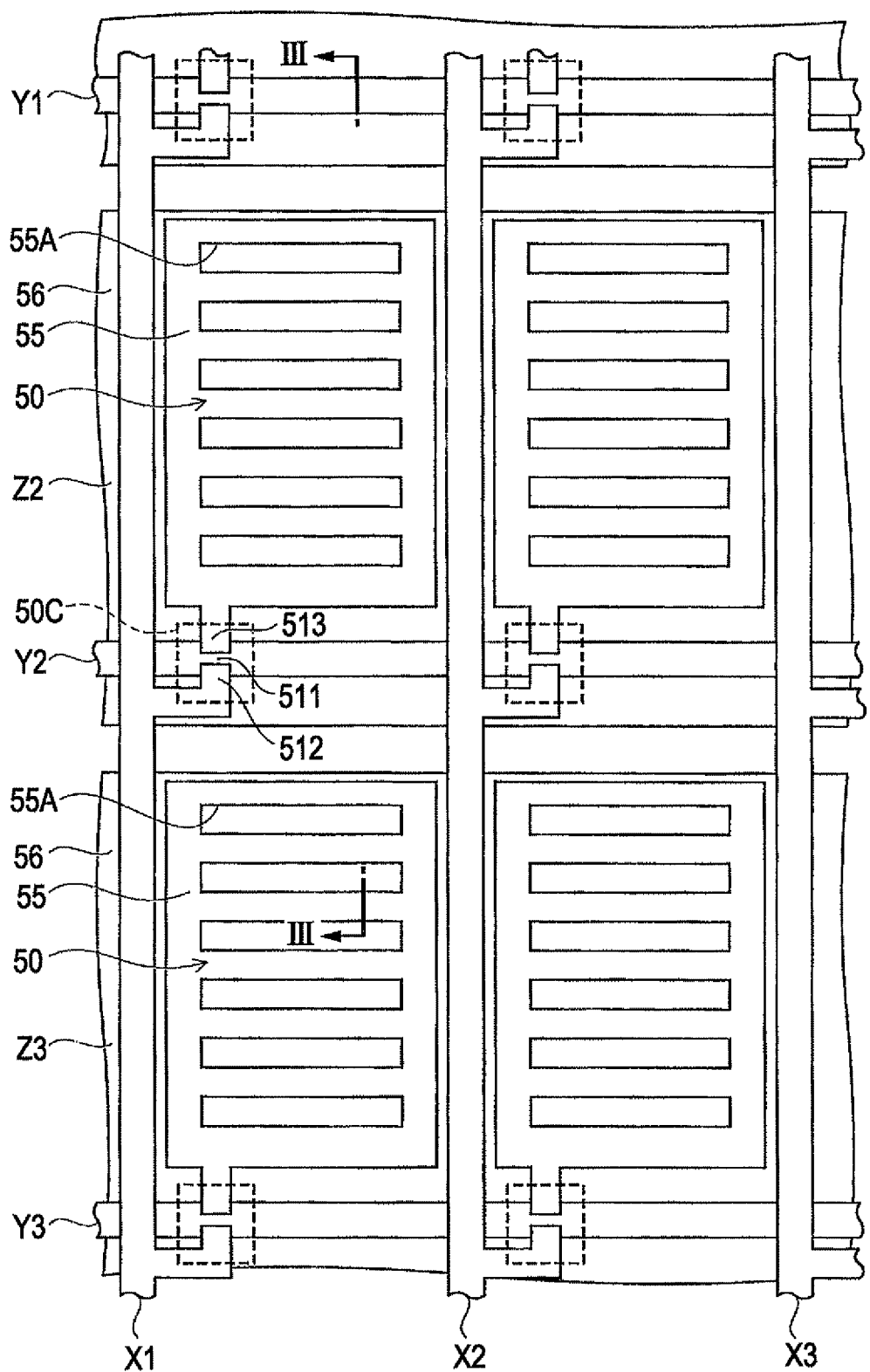
FIG. 2 is an enlarged plan view of pixels that are provided in the liquid crystal device.
Figure 3:
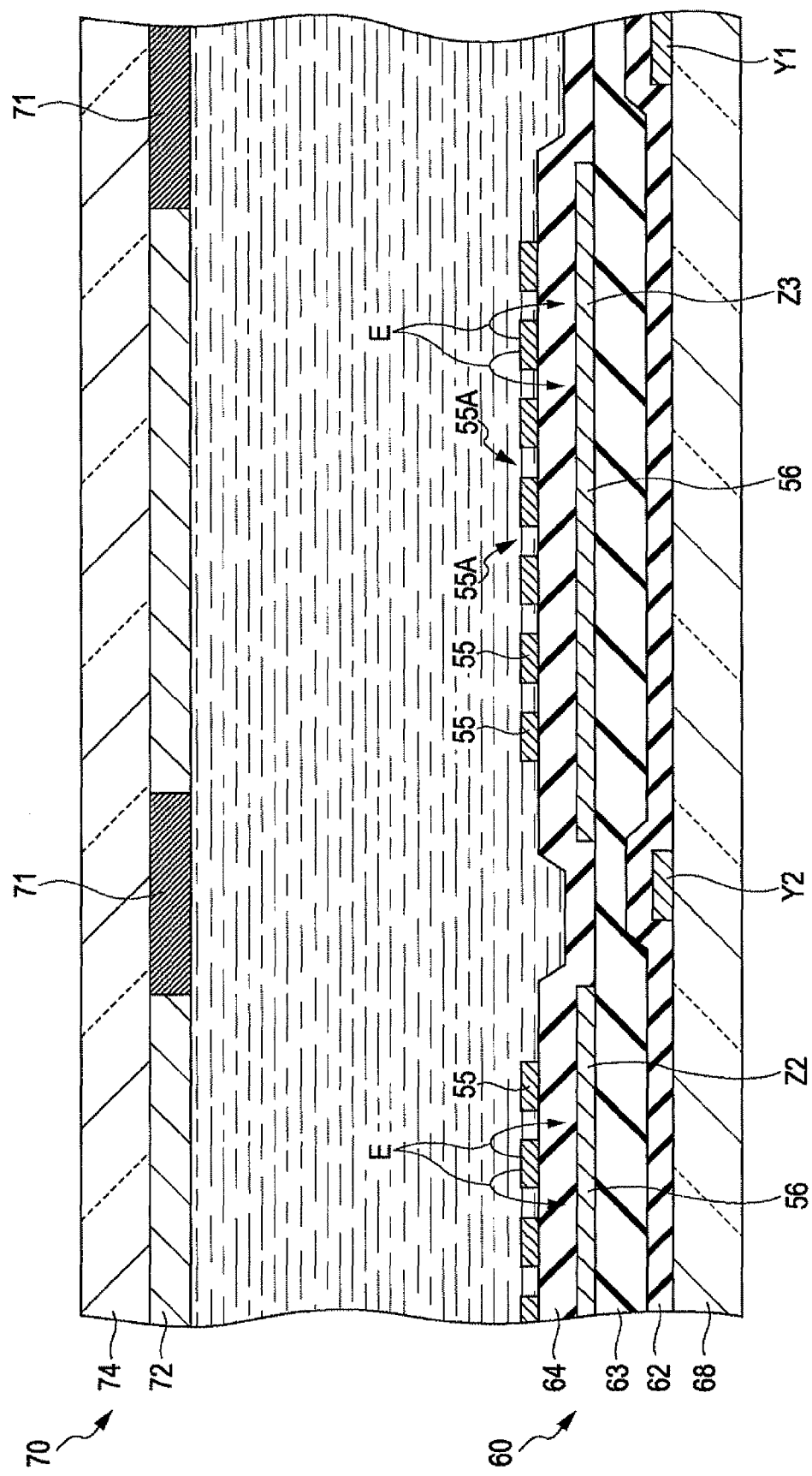
FIG. 3 is a cross-sectional view of the pixels provided in the liquid crystal device.

FIG. 2 is an enlarged plan view of the pixels 50. FIG. 3 is a cross-sectional view of the pixels 50, taken along the line III-III in FIG. 2.

As shown in FIG. 3, the liquid crystal panel AA includes an element substrate 60, an opposite substrate 70 and a liquid crystal. The element substrate 60, which serves as a first substrate, includes a plurality of the pixel electrodes 55. The opposite substrate 70, which serves as a second substrate, is opposed to the element substrate 60. The liquid crystal is provided between the element substrate 60 and the opposite substrate 70.

As shown in FIG. 2, in the element substrate 60, each pixel 50 is formed in an area surrounded by two adjacent scanning lines Y, each of which is made of a conductive material, and two adjacent data lines X, each of which is made of a conductive material. That is, the pixels 50 are defined by the scanning lines Y and the data lines X.

In the present embodiment, the TFT 51 is an inversely staggered low-temperature polysilicon TFT, and an area 50C (a portion surrounded by broken line in FIG. 2) in which the TFT 51 is formed is provided adjacent to the intersection of the scanning line Y and the data line X.

First, the element substrate 60 will be described.

The element substrate 60 has a glass substrate 68. On the glass substrate 68, in order to prevent a change in characteristic of the TFT 51 due to a surface roughness or dirt of the glass substrate 68, a base insulating film (not shown) is formed over the entire surface of the element substrate 60.

On the base insulating film, the scanning lines Y made of a conductive material are formed.

Each of the scanning lines Y is provided along the boundary between the adjacent pixels 50 and forms a gate electrode 511 of the TFT 51 at a portion adjacent to the intersection with the data line X.

On the scanning lines Y, the gate electrodes 511 and the base insulating film, a gate insulating film 62 is formed over the entire face of the element substrate 60.

In the area 50C in which the TFT 51 is formed on the gate insulating film 62, a semiconductor layer (not shown) formed of a low-temperature polysilicon and an Ohmic contact layer (not shown) formed of an N+low-temperature polysilicon are laminated opposite the gate electrode 511. In the Ohmic contact layer, a source electrode 512 and a drain electrode 513 are laminated and thereby a low-temperature polysilicon TFT is formed.

The source electrode 512 is formed of the same conductive material as the data line X. That is, the source electrode 512 is formed so as to protrude from the data line X. The data lines X are provided so as to intersect with the scanning lines Y and the common lines Z.

As described above, the gate insulating film 62 is formed on the scanning lines Y, and the data lines X are formed on the gate insulating film 62. Therefore, each of the data lines X is insulated from the scanning lines Y by the gate insulating film 62.

On the data lines X, the source electrodes 512, the drain electrodes 513 and the gate insulating film 62, a first insulating film 63 is formed over the entire face of the element substrate 60.

On the first insulating film 63, the common lines Z, which are formed of a transparent conductive material such as ITO (Indium Tin Oxide), are formed. Each of the common lines Z is provided along the scanning line Y, and the common line Z is integrally formed with the common electrode 56 that is separately provided in units of horizontal line.

On the common lines Z, the common electrodes 56 and the first insulating film 63, a second insulating film 64 is formed over the entire face of the element substrate 60.

On the second insulating film 64, the pixel electrodes 55, which are formed of a transparent conductive material such as ITO (Indium Tin Oxide), are formed in areas, each of which is opposite the common electrode 56. Each pixel electrode 55 is connected through the above described first insulating film 63 and a contact hole (not shown), which is formed in the second insulating film 64, to the drain electrode 513.

In each of the pixel electrodes 55, a plurality of slits 55A are provided at predetermined intervals for generating a fringe field (electric field E) between the pixel electrode 55 itself and the common electrode 56. That is, the liquid crystal of the liquid crystal device 1 operates in an FFS mode.

On the pixel electrodes 55 and the second insulating film 64, an alignment layer (not shown), which is formed of an organic film such as a polyimide film, is formed over the entire face of the element substrate 60.

Next, the opposite substrate 70 will be described.

The opposite substrate 70 includes a glass substrate 74. On the glass substrate 74, a light shielding film 71, which serves as a black matrix, is formed at positions that are opposite the scanning lines Y. In addition, in areas on the glass substrate 74, excluding an area in which the light shielding film 71 is formed, color filters 72 are formed.

On the light shielding film 71 and the color filters 72, an alignment layer (not shown) is formed over the entire face of the opposite substrate 70.

Referring back to FIG. 1, the scanning line driving circuit 10 sequentially supplies the plurality of scanning lines Y with a selection voltage that makes the TFTs 51 enter an on state. For example, as a selection voltage is supplied to a scanning line Y, all the TFTs 51 connected to the scanning line Y enter an on state and, as a result, all the pixels 50 associated with this scanning line Y are selected.

The data line driving circuit 20 supplies image signals to the data lines X and writes image voltages based on the image signals to the pixel electrodes 55 through the TFTs 51, which are in an on state.

Here, the data line driving circuit 20 alternately performs positive polarity writing and negative polarity writing in units of horizontal line. In the positive polarity writing, the data line driving circuit 20 supplies the data lines X with positive polarity image signals of voltages that are higher in electric potential than the voltage of the common electrode 56 to thereby write the pixel electrodes 55 with image voltages based on the positive polarity image signals. In the negative polarity writing, the data line driving circuit 20 supplies the data lines X with negative polarity image signals of voltages that are lower in electric potential than the voltage of the common electrode 56 to thereby write the pixel electrodes 55 with image voltages based on the negative polarity image signals.

The control circuit 30 alternately supplies the common lines z with a voltage VCOML, which serves as a first voltage, or a voltage VCOMH, which serves as a second voltage, that is higher in electric potential than the voltage VCOML.

Note that circuit elements, such as transistors, that constitute the above scanning line driving circuit 10, the data line driving circuit 20, the control circuit 30, and the like, are formed in a peripheral region (window frame region) around the display area A using SOG technology.

The above described liquid crystal device 1 operates as follows.

That is, first, any one of the voltage VCOML and the voltage VCOMH is selectively supplied from the control circuit 30 to each of the common lines Z.

Specifically, the voltage VCOML or the voltage VCOMH is alternately supplied to each common line Z every one frame period. For example, in a one frame period, when a p-th common line Zp (p is an integer that satisfies $1 \leq p \leq 320$) is supplied with the voltage VCOML, the common line Zp is supplied with the voltage VCOMH in the next one frame period. On the other hand, in a one frame period, when the common line Zp is supplied with the voltage VCOMH, the common line Zp is supplied with the voltage VCOML in the next one frame period.

In addition, different voltages are supplied to any adjacent common lines Z. For example, in a one frame period, when the common line Zp is supplied with the voltage VCOML, a (p−1)th common line Z(p−1) and a (p+1)th common line Z(p+1) are supplied with the voltage VCOMH in the same one frame period. On the other hand, in a one frame period, the common line Zp is supplied with the voltage VCOMH, the (p−1)th common line Z(p−1) and the (p+1)th common line Z(p+1) are supplied with the voltage VCOML in the same one frame period.

Next, by sequentially supplying a selection voltage from the scanning line driving circuit 10 to 320 rows of the scanning lines Y (Y1 to Y320), all the TFTs 51 connected to each of the scanning lines Y are sequentially made to an on state and, as a result, all the pixels 50 associated with each of the scanning lines Y are sequentially selected.

Next, in synchronization with the selection of the pixels 50, positive polarity image signals or negative polarity image signals are alternately supplied from the data line driving circuit 20 to the data lines X in units of horizontal line in accordance with the voltage of the common electrode 56.

Specifically, among the 320 rows of the common lines z (Z1 to Z320), when the common line Zp associated with the selected pixels 50 is supplied with the voltage VCOML, positive polarity image signals are supplied to the data lines X. On the other hand, among 320 rows of the common lines z (Z1 to Z320), the common line Zp associated with the selected pixels 50 is supplied with the voltage VCOMH, negative polarity image signals are supplied to the data lines X.

Then, image signals are supplied from the data line driving circuit 20 to all the pixels 50 selected by the scanning line driving circuit 10 through the data lines X and the TFTs 51, which are in an on state, and thereby image voltages based on the image signals are written to the pixel electrodes 55. In this manner, there occurs a difference in electric potential between each of the pixel electrodes 55 and the common electrode 56 and, as a result, a driving voltage is applied to the liquid crystal.

As the driving voltage is applied to the liquid crystal, alignment and/or order of the liquid crystal change and, as a result, light emitted from the backlight 41 and transmitted through the liquid crystal varies. Grayshade is performed in such a manner that the above varied light is transmitted through a color filter.

Note that the driving voltage applied to the liquid crystal is held, owing to the storage capacitor 53, during a period of time that is three digits longer than a period of time during which an image voltage is being written.

Figure 4:
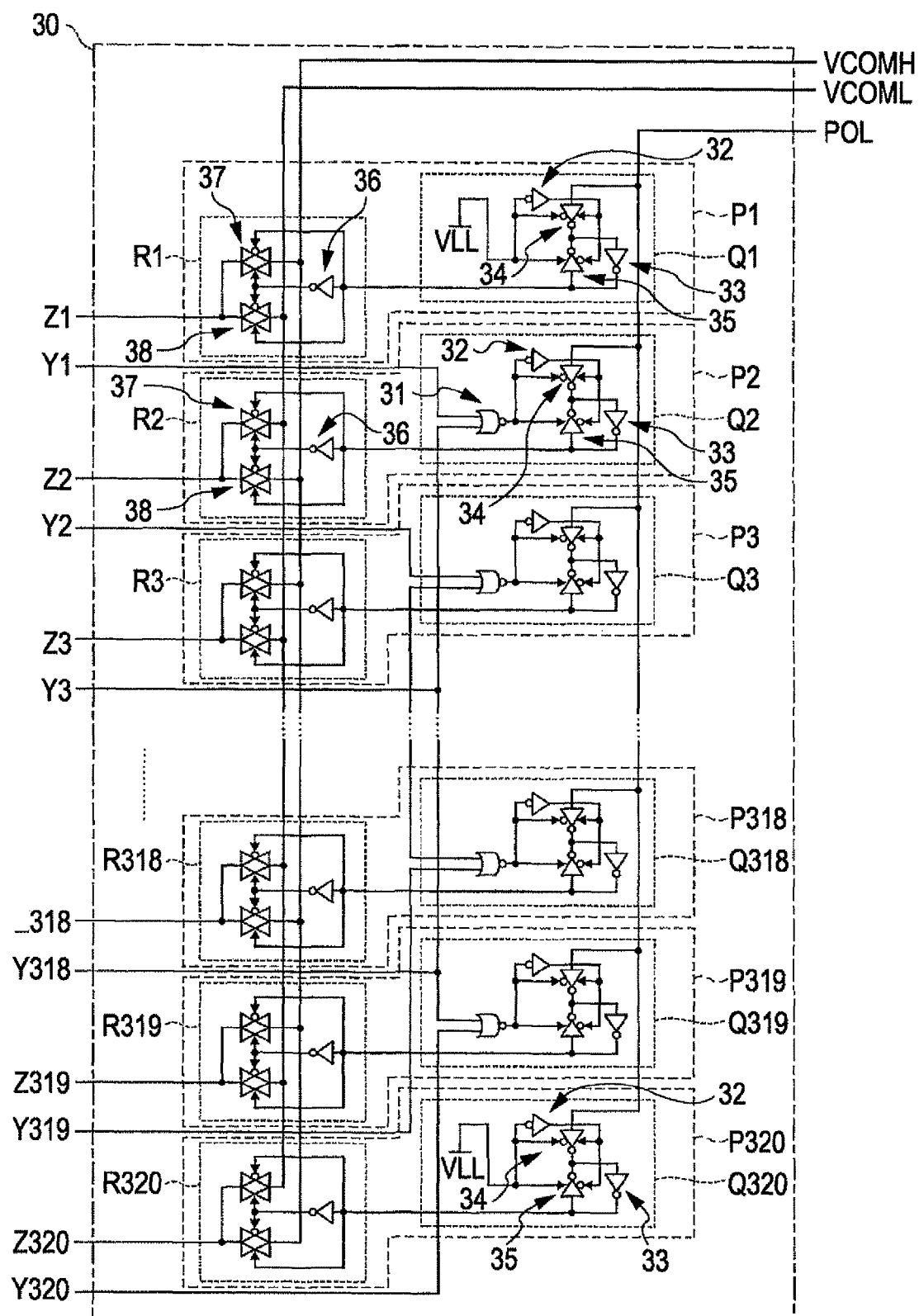
FIG. 4 is a block diagram of a control circuit that is provided in the liquid crystal device.

FIG. 4 is a block diagram of the control circuit 30.

The control circuit 30 includes 320 unit control circuits P (P1 to P320) in correspondence with 320 rows of the scanning lines Y (Y1 to Y320). Each of the unit control circuits P is supplied with the voltage VCOML, the voltage VCOMH and a polarity control signal POL that selects any one of the voltage VCOML and the voltage VCOMH.

Each unit control circuit P includes a latch circuit Q, which holds the polarity control signal POL, and a selection circuit R, which selectively outputs any one of the voltage VCOML and the voltage VCOMH in accordance with the polarity control signal POL. The latch circuit Q may be roughly classified into two types on the basis of a method by which the polarity control signal POL is held. One of the types includes a latch circuit Q1 that is provided in correspondence with the first scanning line Y1 and a latch circuit Q320 that is provided in correspondence with the 320th scanning line Y320. The other type includes latch circuits Q2 to Q319 other than the above latch circuits Q1 and Q320. First, the latch circuits Q2 to Q319 will be described below.

A latch circuit Qq, which is provided in correspondence with a q-th (q is an integer that satisfies $2 \leq q \leq 319$) scanning line Yq, includes a NOT-OR operation circuit (hereinafter, referred to as NOR circuit) 31, a first inverter 32, a second inverter 33, a first clocked inverter 34 and a second clocked inverter 35.

Two input terminals of the NOR circuit 31 are respectively connected to a (q−1)th scanning line Y(q−1) and a (q+1)th scanning line Y(q+1). The output terminal of the NOR circuit 31 is connected to the first inverter 32, the inverting input control terminal of the first clocked inverter 34 and the non-inverting input control terminal of the second clocked inverter 35.

The output terminal of the first inverter 32 is connected to the non-inverting input control terminal of the first clocked inverter 34 and the inverting input control terminal of the second clocked inverter 35.

The polarity control signal POL is input from the input terminal of the first clocked inverter 34. The output terminal of the first clocked inverter 34 is connected to the input terminal of the second inverter 33.

The input terminal of the second clocked inverter 35 is connected to the output terminal of the second inverter 33, and the output terminal of the second clocked inverter 35 is connected to the input terminal of the second inverter 33.

The above latch circuit Qq operates as follows.

That is, as at least any one of the scanning line Y(q−1) and the scanning line Y(p+1) is supplied with a selection voltage, the NOR circuit 31 of the latch circuit Qq outputs an L level signal. The L level signal is input to the inverting input control terminal of the first clocked inverter 34 and is also inverted by the first inverter 32 and input to the non-inverting input control terminal of the first clocked inverter 34 as an H level signal. Therefore, the first clocked inverter 34 enters an on state to thereby invert and output the polarity control signal POL. The polarity control signal POL that is inverted and output from the first clocked inverter 34 is inverted by the second inverter 33 and output to the selection circuit R.

As described above, as at least any one of the scanning line Y(q−1) and the scanning line Y(q+1) is supplied with a selection voltage by the scanning line driving circuit, the latch circuit Qp takes in the polarity control signal POL.

On the other hand, when both the scanning line Y(q−1) and the scanning line Y(p+1) are not supplied with a selection voltage, the NOR circuit 31 of the latch circuit Qq outputs an H level signal. The H level signal is input to the non-inverting input control terminal of the second clocked inverter 35 and is inverted by the first inverter 32 and input to the inverting input control terminal of the second clocked inverter 35 as an L level signal. Therefore, the second clocked inverter 35 enters an on state to thereby invert and output the polarity control signal POL that is output from the second inverter 33. The polarity control signal POL that is inverted and output from the second clocked inverter 35 is input again by the second inverter 33.

As described above, when both the scanning line Y(q−1) and the scanning line Y(p+1) are not supplied with a selection voltage by the scanning line driving circuit, the latch circuit Qp holds the polarity control signal POL, which has been already taken in, by the second inverter 33 and the second clocked inverter 35.

Next, the latch circuits Q1 and Q320 will be described below.

Each of the latch circuits Q1 and Q320, in comparison with the above described latch circuit Qq, includes a low electric potential power source that outputs an L level signal in place of the NOR circuit 31. The other configuration is the same as that of the above described latch circuit Qq.

These latch circuits Q1 and Q320 operate as follows.

That is, an L level signal is always output from a low electric potential power source of a voltage VLL. The L level signal is input to the inverting input control terminal of the first clocked inverter 34 and is inverted by the first inverter 32 and input to the non-inverting input control terminal of the first clocked inverter 34 as an H level signal. Therefore, the first clocked inverter 34 is always in an on state, and always inverts the polarity control signal POL and then outputs the signal POL. The polarity control signal POL that is inverted and then output from the first clocked inverter 34 is inverted by the second inverter 33 and then output to the selection circuit R.

As described above, the latch circuits Q1 and Q320 each always take in the polarity control signal POL.

The selection circuit R includes an inverter 36, a first transfer gate 37, which is formed of a CMOS transistor and a second transfer gate 38, which is formed of a CMOS transistor.

The input terminal of the inverter 36 is connected to the output terminal of the second inverter 33 of the latch circuit Q, and the polarity control signal POL is input, to the input terminal of the inverter 36. The output terminal of the inverter 36 is connected to the non-inverting input control terminal of the first transfer gate 37 and the inverting input control terminal of the second transfer gate 38.

The inverting input control terminal (gate terminal) of the first transfer gate 37 is connected to the output terminal of the second inverter 33 of the latch circuit Q, and the polarity control signal POL is input to the inverting input control terminal of the first transfer gate 37. The output terminal (drain terminal) of the first transfer gate 37 is connected to the common line Z.

In addition, the voltage VCOMH is input from the input terminal (source terminal) of the first transfer gate 37 of the selection circuit R provided in correspondence with each of the odd-numbered scanning lines Y. On the other hand, the voltage VCOML is input from the input terminal of the first transfer gate 37 of the selection circuit R provided in correspondence with each of the even-numbered scanning lines Y.

The non-inverting input control terminal of the second transfer gate 38 is connected to the output terminal of the second inverter 33 of the latch circuit Q, and the polarity control signal POL is input to the non-inverting input control terminal of the second transfer gate 38. The output terminal of the second transfer gate 38 is connected to the common line Z.

In addition, the voltage VCOML is input from the input terminal of the second transfer gate 38 of the selection circuit R provided in correspondence with each of the odd-numbered scanning lines Y. On the other hand, the voltage VCOMH is input from the input terminal of the second transfer gate 38 of the selection circuit R provided in correspondence with each of the even-numbered scanning lines Y.

Note that the relationship among the voltage VCOMH, the voltage VCOML and the voltages of the polarity control signals POL input to the control terminals (gate terminals) of the first and second transfer gates are set so as to satisfy the relationship such that gate High voltage (high electric potential of the polarity control signal POL)>voltage VCOMH>voltage VCOML>gate Low voltage (low electric potential of the polarity control signal POL) In the present embodiment, the voltages are, for example, set so that the gate High voltage (high electric potential of the polarity control signal POL) is 8 V that is equal to a high voltage VGH, which will be described later, of the scanning line Y, the gate Low voltage (low electric potential of the polarity control signal POL) is −4 V that is equal to a low voltage VGL, which will be described later, of the scanning line Y, the voltage VCOMH is 4 V and the voltage VCOML is 0 V.

Thus, in the first and second transfer gates, the voltage Vgs between the gate and the source becomes 8 V at the maximum. On the other hand, the voltage Vgs between the gate and source of a circuit element, such as the first clocked inverter 34 of the latch circuit Q, is 12 V at the maximum. Thus, the L length of each of the first and second transfer gates may be set to a value smaller than the L length of each transistor that constitutes the latch circuit Q. In the present embodiment, the L length of each transistor that constitutes the latch circuit Q needs to be at least 6 µm, while, on the other hand, the L length of each of the first and second transfer gates of the selection circuit R may be reduced to 4 µm, which is two thirds of the L length of each transistor that constitutes the latch circuit Q.

Because the L length of each of the first and second transfer gates may be reduced, it is possible to make the first and second transfer gates have a low on resistance and, as a result, it is possible to reduce the occurrence of a crosstalk. In addition, if it is not necessary to reduce the resistance of the circuit, wires may be made thinner by an amount by which the resistance of the circuit is reduced because of the first and second transfer gates are made to have a low on resistance. Thus, it is possible to reduce the area of the circuit. In addition, by reducing the L length, it is also possible to realize a low on resistance and, as a result, it is possible to contribute to low power consumption.

The above described selection circuit R operates as follows.

That is, as the L level polarity control signal POL is output from the second inverter 33 of the latch circuit Q, this L level polarity control signal POL is input to the inverting input control terminal of the first transfer gate 37 and is inverted by the inverter 36 and input to the non-inverting input control terminal of the first transfer gate 37 as the H level polarity control signal POL. Therefore, the first transfer gate 37 enters an on state.

When the first transfer gate 37, which is in an on state, is the one provided in the selection circuit R that is provided in correspondence with any one of the odd-numbered scanning lines Y, the first transfer gate 37 outputs the voltage VCOMH to the common line Z. On the other hand, when the first transfer gate 37, which is in an on state, is the one provided in the selection circuit R that is provided in correspondence with any one of the even-numbered scanning lines Y, the first transfer gate 37 outputs the voltage VCOML to the common line Z.

On the other hand, as the H level polarity control signal POL is output from the second inverter 33 of the latch circuit Q, this H level polarity control signal POL is input to the non-inverting input control terminal of the second transfer gate 38 and is inverted by the inverter 36 and input to the inverting input control terminal of the second transfer gate 38 as the L level polarity control signal POL. Therefore, the second transfer gate 38 enters an on state.

When the second transfer gate 38, which is in an on state, is the one provided in the selection circuit R that is provided in correspondence with any one of the odd-numbered scanning lines Y, the second transfer gate 38 outputs the voltage VCOML to the common line Z. On the other hand, when the second transfer gate 38, which is in an on state, is the one provided in the selection circuit R that is provided in correspondence with any one of the even-numbered scanning lines Y, the second transfer gate 38 outputs the voltage VCOMH to the common line Z.

Alternative Embodiment to Selection Circuit R of First Embodiment

Figure 5:
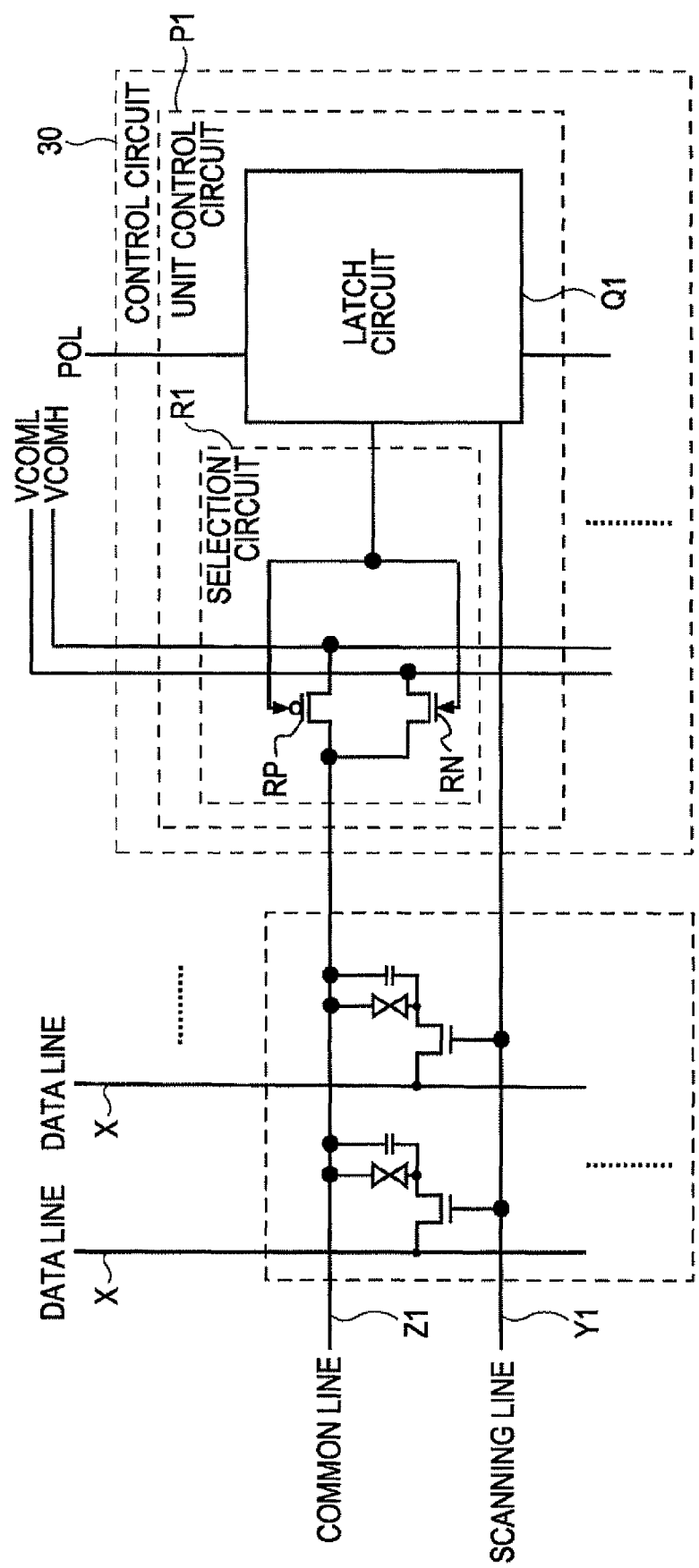
FIG. 5 is a block diagram that shows an alternative embodiment of a selection circuit of the control circuit.

FIG. 5 is a block diagram of a selection circuit RA, which is an alternative embodiment to the selection circuit R of the first embodiment, showing an example in which single channel switching transistors are used as switching elements for transfer gates.

The selection circuit RA includes a Pch transfer gate RP, which is formed of a Pch switching transistor, and an Nch transfer gate RN, which is an Nch switching transistor.

The input terminal (source terminal) of the Pch transfer gate RP is connected to the voltage VCOMH. The control terminal (gate terminal) of the Pch transfer gate RP is connected to the output terminal of the latch circuit Q, and the polarity control signal POL is input to the control terminal of the Pch transfer gate RP. The output terminal (drain terminal) of the Pch transfer gate RP is connected to the common line Z.

By connecting the voltage VCOMH to the input terminal of the Pch transfer gate RP, the voltage VGS between the gate and the source may be increased in comparison with the case in which the voltage VCOMH is connected to the input terminal of the Nch transfer gate RN. Thus, it is possible to realize a desirable operation and, in addition, achieve a low on resistance and a decrease in off leakage.

The input terminal (source terminal) of the Nch transfer gate RN is connected to the voltage VCOML. The control terminal (gate terminal) of the Nch transfer gate RN is connected to the output terminal of the latch circuit Q, and the polarity control signal POL is input to the control terminal of the Nch transfer gate RN. The output terminal (drain terminal) of the Nch transfer gate RN is connected to the common line Z.

By connecting the voltage VCOML to the input terminal of the Nch transfer gate RN, the voltage VGS between the gate and the source may be increased in comparison with the case in which the Pch transfer gate RP is used. Thus, it is possible to realize a desirable operation and, in addition, achieve a low on resistance and a decrease in off leakage.

When the selection circuit RA is used, the second inverter 33 is omitted in the latch circuit Q provided in correspondence with each of the even-numbered scanning lines Y. Then, the polarity control signal POL that is inverted and output from the first clocked inverter 34 is output as it is. Thus, it is possible to alternately output the voltage VCOMH or the voltage VCOML to the common line z.

The above described selection circuit RA operates as follows.

That is, as the L level polarity control signal POL is output from the latch circuit Q, this L level polarity control signal POL is input to the control terminal of the Pch transfer gate RP. Therefore, the Pch transfer gate RP enters an on state. The Pch transfer gate RP, which is in an on state, outputs the voltage VCOMH to the common line Z.

On the other hand, as the H level polarity control signal POL is output from the latch circuit Q, this H level polarity control signal POL is input to the control terminal of the Nch transfer gate RN. Therefore, the Nch transfer gate RN enters an on state. The Nch transfer gate RN, which is in an on state, outputs the voltage VCOML to the common line Z.

In the selection circuit RA described above, by using single channel switching elements as transfer gates, it is possible to reduce the area of a circuit in comparison with the case in which a CMOS switching element is used as in the case of the selection circuit R. In addition, the voltage VCOMH having a high electric potential is connected to the Pch switching element, the voltage VCOML having a low electric potential is connected to the Nch switching element, and the Pch switching element or the Nch switching element is exclusively made into an on state. Thus, the selection circuit RA may be driven only by a single line control signal, and it is not necessary to form an inversion signal using the inverter 36 as in the case of the selection circuit R, so that the inverter 36 may be omitted. Thus, it is possible to achieve a further reduced area of a circuit.

Note that the relationship among the voltage VCOMH, the voltage VCOML and the voltages of the polarity control signals POL input to the control terminals (gate terminals) of the first and second transfer gates are set so as to satisfy the relationship such that gate High voltage (high electric potential of the polarity control signal POL)>voltage VCOMH>voltage VCOML>gate Low voltage (low electric potential of the polarity control signal POL).

In the present embodiment, the voltages are, for example, set so that the gate High voltage (high electric potential of the polarity control signal POL) is 3 V that is equal to a high voltage VGH, which will be described later, of the scanning line Y, the gate Low voltage (low electric potential of the polarity control signal POL) is −4 V that is equal to a low voltage VGL, which will be described later, of the scanning line Y, the voltage VCOMH is 4 V and the voltage VCOML is 0 V.

Thus, in the first and second transfer gates, the voltage Vgs between the gate and the source becomes 8 V at the maximum. On the other hand, the voltage Vgs between the gate and source of a circuit element, such as the first clocked inverter 34 of the latch circuit Q, is 12 V at the maximum, the L length of each of the first and second transfer gates may be set to a value smaller than the L length of each transistor that constitutes the latch circuit Q. In the present embodiment, the L length of each transistor that constitutes the latch circuit Q needs to be at least 6 μm, while, on the other hand, the L length of each of the first and second transfer gates of the selection circuit R may be reduced to 4 μm, which is two thirds of the L length of each transistor that constitutes the latch circuit Q.

Because the L length of each of the first and second transfer gates may be reduced, it is possible to make the first and second transfer gates have a low on resistance and, as a result, it is possible to reduce the occurrence of a crosstalk. In addition, if it is not necessary to reduce the resistance of the circuit, wires may be made thinner by an amount by which the resistance of the circuit is reduced because of the first and second transfer gates are made to have a low on resistance. Thus, it is possible to reduce the area of the circuit. In addition, by reducing the L length, it is also possible to realize a low on resistance and, as a result, it is possible to contribute to low power consumption.

In addition, by setting the above described relationship in electric potential, even when single channel switching elements are used for transfer gates, it is possible to achieve an effective low on resistance and a decrease in off leakage of the switching elements. Furthermore, the relationship among the voltage VCOMH, the voltage VCOML and the voltages of the polarity control signals POL applied to the gate terminals of the switching elements as gate electric potentials are set so as to satisfy the relationship such that gate High voltage>voltage VCOMH−|threshold value of the Pch transfer gate|>voltage VCOML+|threshold value of the Nch transfer gate|>gate Low voltage. Thus, each of the switching elements may be made into an off state with a voltage that is equal to or lower than a threshold value, so that it is possible to reliably prevent an off leakage.

The operation of the control circuit 30 that includes the above described latch circuit Q and the selection circuit R (or selection circuit RA) will be described with reference to FIG. 5.

Figure 6:
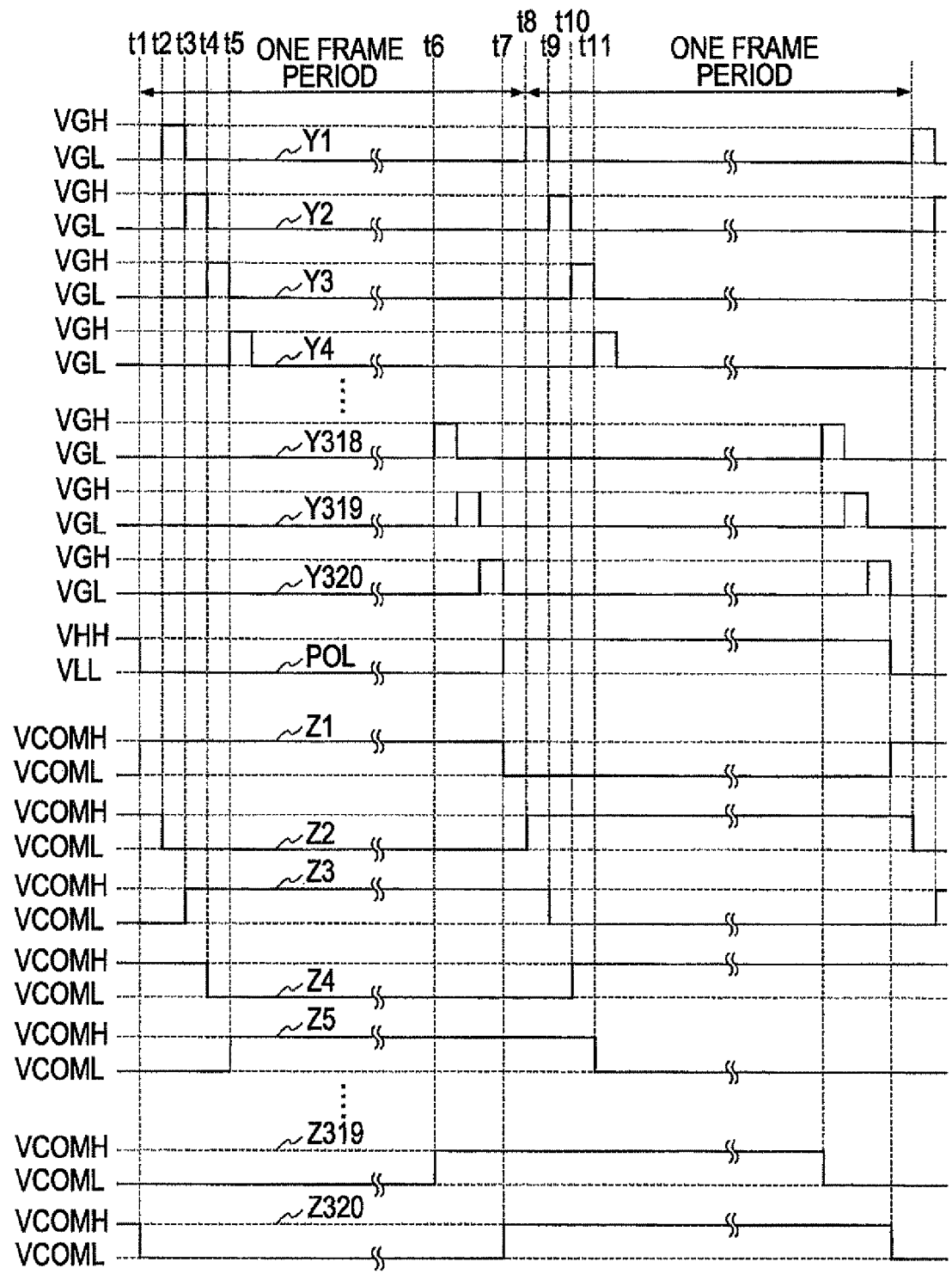
FIG. 6 is a timing chart of the control circuit that is provided in the liquid crystal device.

FIG. 6 is a timing chart of the control circuit 30.

First, at time t1, the polarity control signal POL is set to the voltage VLL, thus setting the polarity control signal POL to an L level. Then, the unit control circuits P1 and P320 take in the L level polarity control signal POL using the latch circuits Q1 and Q320 that always take in the polarity control signal POL (when the selection circuit RA is used, the H level polarity control signal POL using the latch circuit Q320), and then output the voltage VCOMH and the voltage VCOML using the selection circuits R1 and R320, respectively. Therefore, the common line Z1 connected to the unit control circuit P1 attains the voltage VCOMH, and the common line Z320 connected to the unit control circuit P320 attains the voltage VCOML.

In addition, the voltage VGH is 8 V, and the voltage VGL is −4 V.

Subsequently, at time t2, a selection voltage is supplied from the scanning line driving circuit 10 to the first scanning line Y1 to set the voltage of the scanning line Y1 to the voltage VGH. Then, the unit control circuit P2 provided in correspondence with the scanning line Y2 that is arranged adjacent to the scanning line Y1 takes in the L level polarity control signal POL using the latch circuit Q2 (when the selection circuit RA is used, takes in the H level polarity control signal POL using the latch circuit Q2), and outputs the voltage VCOML using the selection circuit R2. Therefore, the common line Z2 connected to the unit control circuit P2 attains the voltage VCOML.

After that, at time t3, the supply of a selection voltage from the scanning line driving circuit 10 to the scanning line Y1 is stopped to set the voltage of the scanning line Y1 to the voltage VGL.

At the same time, a selection voltage is supplied from the scanning line driving circuit 10 to the second scanning line Y2 to thereby set the voltage of the scanning line Y2 to the voltage VGH. Then, the unit control circuit P3 provided in correspondence with the scanning line Y3 that is arranged adjacent to the scanning line Y2 takes in the L level polarity control signal POL using the latch circuit Q3, and outputs the voltage VCOMH using the selection circuit R3. Therefore, the common line Z3 connected to the unit control circuit P3 attains the voltage VCOMH.

After that, at time t4, the supply of a selection voltage from the scanning line driving circuit 10 to the scanning line Y2 is stopped to set the voltage of the scanning line Y2 to the voltage VGL.

At the same time, a selection voltage is supplied from the scanning line driving circuit 10 to the third scanning line Y3 to thereby set the voltage of the scanning line Y3 to the voltage VGH. Then, the unit control circuit P4 provided in correspondence with the scanning line Y4 that is arranged adjacent to the scanning line Y3 takes in the L level polarity control signal POL using the latch circuit Q4 (when the selection circuit RA is used, takes in the H level polarity control signal POL using the latch circuit Q4), and outputs the voltage VCOML using the selection circuit R4. Therefore, the common line Z4 connected to the unit control circuit P4 attains the voltage VCOML.

In the meantime, the unit control circuit P2 provided in correspondence with the scanning line Y2 that is arranged adjacent to the scanning line Y3 takes in the L level polarity control signal POL using the latch circuit Q2, and outputs the voltage VCOML using the selection circuit R2. Therefore, the common line Z2 connected to the unit control circuit P2 attains the voltage VCOML.

After that, at time t5, the supply of a selection voltage from the scanning line driving circuit 10 to the scanning line Y3 is stopped to set the voltage of the scanning line Y3 to the voltage VGL.

At the same time, a selection voltage is supplied from the scanning line driving circuit 10 to the fourth scanning line Y4 to thereby set the voltage of the scanning line Y4 to the voltage VGH. Then, the unit control circuit P5 provided in correspondence with the scanning line Y5 that is arranged adjacent to the scanning line Y4 takes in the L level polarity control signal POL using the latch circuit Q5, and outputs the voltage VCOMH using the selection circuit R5. Therefore, the common line Z5 connected to the unit control circuit P5 attains the voltage VCOMH.

In the meantime, the unit control circuit P3 provided in correspondence with the scanning line Y3 that is arranged adjacent to the scanning line Y4 takes in the L level polarity control signal POL using the latch circuit Q3, and outputs the voltage VCOMH using the selection circuit R3. Therefore, the common Line Z3 connected to the unit control circuit P3 attains the voltage VCOMH.

Thereafter, as a selection voltage is supplied from the scanning line driving circuit 10 to any one of the odd-numbered scanning lines Y (except the first scanning line Y1), it operates as in the case shown at time t4, while, on the other hand, as a selection voltage is supplied to any one of the even-numbered scanning lines Y (except the 320th scanning line Y320), it operates as in the case shown at time t5.

After that, at time t7, the supply of a selection voltage from the scanning line driving circuit 10 to the 320th scanning line Y320 is stopped to set the voltage of the scanning line Y320 to the voltage VGL.

At the same time, the polarity control signal POL is set to the voltage VHH, thus setting the polarity control signal POL to an H level. Then, the unit control circuits P1 and P320 take in the H level polarity control signal POL using the latch circuits Q1 and Q320 that always take in the polarity control signal POL (when the selection circuit RA is used, take in the L level polarity control signal POL using the latch circuit Q320), and then output the voltage VCOML and the voltage VCOMH using the selection circuits R1 and R320, respectively. Therefore, the common line Z1 connected to the unit control circuit P1 attains the voltage VCOML, and the common line Z320 connected to the unit control circuit P320 attains the voltage VCOMH.

Subsequently, at time t8, as in the case shown at time t2, a selection voltage is supplied from the scanning line driving circuit 10 to the scanning line Y1 to set the voltage of the scanning line Y1 to the voltage VGH. Then, the unit control circuit P2 outputs the voltage VCOMH, so that the common line z2 connected to the unit control circuit P2 attains the voltage VCOMH.

After that, at time t9, as in the case shown at time t3, the supply of a selection voltage from the scanning line driving circuit 10 to the scanning line Y1 is stopped to set the voltage of the scanning line Y1 to the voltage VGL.

At the same time, as in the case shown at time t3, a selection voltage is supplied from the scanning line driving circuit 10 to the scanning line Y2 to thereby set the voltage of the scanning line Y2 to the voltage VGH. Then, the unit control circuit P3 outputs the voltage VCOML, so that the common line Z3 connected to the unit control circuit P3 attains the voltage VCOML.

After that, at time t10, as in the case shown at time t4, the supply of a selection voltage from the scanning line driving circuit 10 to the scanning line Y2 is stopped to set the voltage of the scanning line Y2 to the voltage VGL.

At the same time, as in the case shown at time t4, a selection voltage is supplied from the scanning line driving circuit 10 to the scanning line Y3 to thereby set the voltage of the scanning line Y3 to the voltage VGH. Then, the unit control circuit P4 outputs the voltage VCOMH, so that the common line Z4 connected to the unit control circuit P4 attains the voltage VCOMH.

In addition, as in the case shown at time t4, the unit control circuit P2 outputs the voltage VCOMH, so that the common line Z2 connected to the unit control circuit P2 attains the voltage VCOMH.

After that, at time t11, as in the case shown at time t5, the supply of a selection voltage from the scanning line driving circuit 10 to the scanning line Y3 is stopped to set the voltage of the scanning line Y3 to the voltage VGL.

At the same time, as in the case shown at time t5, a selection voltage is supplied from the scanning line driving circuit 10 to the scanning line Y4 to thereby set the voltage of the scanning line Y4 to the voltage VGH. Then, the unit control circuit P5 outputs the voltage VCOML, so that the common line Z5 connected to the unit control circuit P5 attains the voltage VCOML.

In addition, as in the case shown at time t5, the unit control circuit P3 outputs the voltage VCOML, so that the common line Z3 connected to the unit control circuit P3 attains the voltage VCOML.

Thereafter, as a selection voltage is supplied from the scanning line driving circuit 10 to any one of the odd-numbered scanning lines Y (except the first scanning line Y1), it operates as in the case shown at time t10, while, on the other hand, as a selection voltage is supplied to any one of the even-numbered scanning lines Y (except the 320th scanning line Y320), it operates as in the case shown at time t11.

The operation of the liquid crystal device 1 that includes the above described control circuit 30 will be described with reference to FIG. 7 and FIG. 8. FIG. 7 is a timing chart when the liquid crystal device 1 performs positive polarity writing. FIG. 8 is a timing chart when the liquid crystal device 1 performs negative polarity writing.

In FIG. 7 and FIG. 8, GATE(r) represents a voltage of the r-th scanning line Yr (r is an integer that satisfies $1 \leq r \leq 320$) among the 320 rows of the scanning lines Y, and SOURCE(s) represents a voltage of the s-th data line Xs (s is an integer that satisfies $1 \leq s \leq 240$) among 240 columns of the data lines X. In addition, PIX(r, s) represents a voltage of the pixel electrode 55 of the r-th row and s-th column pixel 50 that is provided at a position corresponding to the intersection of the r-th scanning line Yr and the s-th data line Xs. In addition, VCOM(r) represents a voltage of the common electrode 56 connected to the r-th common line Zr.

First, the case when the liquid crystal device 1 performs positive polarity writing will be described with reference to FIG. 7.

At time t21, the control circuit 30 supplies the common line Zr with the voltage VCOML. Then, a voltage VCOM(r) of the common electrode 56 connected to the common line Zr gradually decreases and, at time t22, becomes the voltage VCOML.

As the voltage VCOM(r) of the common electrode 56 connected to the common line Zr decreases, a voltage PIX(r, s) of the pixel electrode 55 of the r-th row and s-th column pixel 50 decreases so as to maintain a difference in electric potential between the voltage VCOM(r) and the voltage PIX (r, s). Therefore, the voltage PIX(r, s) of the pixel electrode 55 of the r-th row and s-th column pixel 50 gradually decreases and, at time t22, becomes a voltage V11.

At time t23, the scanning line driving circuit 10 supplies the scanning line Yr with a selection voltage. Then, the voltage GATE(r) of the scanning line Yr increases and, at time t24, becomes the voltage VGH. In this manner, all the TFTs 51 connected to the scanning line Yr enter an on state.

At time t25, the data line driving circuit 20 supplies the data line Xs with a positive polarity image signal. Then, the voltage SOURCE(s) of the data line Xs gradually increases and, at time t26, becomes a voltage VP3.

The voltage SOURCE(s) of the data line Xs is written to the pixel electrode 55 of the r-th row and s-th column pixel 50 through the TFT 51, which is in an on state, that is connected to the scanning line Yr as an image voltage based on the positive polarity image signal. Therefore, the voltage PIX(r, s) of the pixel electrode 55 of the r-th row and s-th column pixel 50 gradually increases and, at time t26, becomes the voltage VP3, which has the same electric potential as the voltage SOURCE(s) of the data line Xs.

At time t27, the scanning line driving circuit 10 stops supplying a selection voltage to the scanning line Yr. Then, the voltage GATE(r) of the scanning line Yr decreases and, at time t28, becomes the voltage VGL. In this manner, all the TFTs 51 connected to the scanning line Yr enter an off state.

Next, the case when the liquid crystal device 1 performs negative polarity writing will be described with reference to FIG. 8.

At time t31, the control circuit 30 supplies the common line Zr with the voltage VCOMH. Then, a voltage VCOM(r) of the common electrode 56 connected to the common line Zr gradually increases and, at time t32, becomes the voltage VCOMH.

As the voltage VCOM(r) of the common electrode 56 connected to the common line Zr increases, a voltage PIX(r, s) of the pixel electrode 55 of the r-th row and s-th column pixel 50 increases so as to maintain a difference in electric potential between the voltage VCOM(r) and the voltage PIX (r, s). Therefore, the voltage PIX(r, s) of the pixel electrode 55 of the r-th row and s-th column pixel 50 gradually increases and, at time t32, becomes a voltage VP6.

At time t33, the scanning line driving circuit 10 supplies the scanning line Yr with a selection voltage. Then, the voltage GATE(r) of the scanning line Yr increases and, at time t34, becomes the voltage VGH. In this manner, all the TFTs 51 connected to the scanning line Yr enter an on state.

At time t35, the data line driving circuit 20 supplies the data line Xs with a negative polarity image signal. Then, the voltage SOURCE(s) of the data line Xs gradually decreases and, at time t36, becomes a voltage VP4.

The voltage SOURCE(s) of the data line Xs is written to the pixel electrode 55 of the r-th row and s-th column pixel 50 through the TFT 51, which is in an on state, that is connected to the scanning line Yr as an image voltage based on the negative polarity image signal. Therefore, the voltage PIX(r, s) of the pixel electrode 55 of the r-th row and s-th column pixel 50 gradually decreases and, at time t36, becomes the voltage VP4, which has the same electric potential as the voltage SOURCE(s) of the data line Xs.

At time t37, the scanning line driving circuit 10 stops supplying a selection voltage to the scanning line Yr. Then, the voltage GATE(r) of the scanning line Yr decreases and, at time t38, becomes the voltage VGL. In this manner, all the TFTs 51 connected to the scanning line Yr enter an off state.

According to the present embodiment, the following advantageous effects are obtained.

(1) The voltage VCOML is supplied to the common line Z, and the voltage of the common electrode 56 is set to the VCOML. After that, a positive polarity image signal is supplied to the data line X and, then, a positive polarity image voltage is written to the pixel electrode 55. On the other hand, the voltage VCOMH is supplied to the common line Z, and the voltage of the common electrode 56 is set to the voltage VCOMH. After that, a negative polarity image signal is supplied to the data line X and, then, a negative polarity image voltage is written to the pixel electrode 55. Therefore, electric charge does not move between the storage capacitor 53 and the pixel capacitor 54, unlike the case of the above described existing example, so that, even when variation in characteristics of the storage capacitor 53 occurs, variation in voltage of the pixel electrode 55 does not occur. Thus, it is possible to suppress deterioration of display quality.

(2) The voltage VCOM(r) of the common electrode 56 is changed to the voltage VCOML or the voltage VCOMH. Thus, because the voltage of one of the electrodes (auxiliary capacitor electrode) of the storage capacitor 53 may be changed as in the case of the common electrode 56, it is possible to integrally form the storage capacitor 53 with the pixel capacitor 54. Thus, the liquid crystal device according to the aspects of the invention may be configured so that the liquid crystal device 1 that includes the pixel electrodes 55 and the common electrodes 56, which constitute the pixel capacitors 54, formed on the element substrate 60 among the element substrate 60 and the opposite substrate 70, which are a pair of substrates that hold the liquid crystal.

(3) The common electrode 56 is separately provided in units of horizontal line. Then, the voltage VCOML or the voltage VCOMH is alternately supplied to the common electrodes 56 in units of horizontal line, and, in correspondence with the voltages of these common electrodes 56, a positive polarity image signal or a negative polarity image signal is alternately supplied to each of the data lines X in units of horizontal line. Therefore, the pixels 50 on which positive polarity writing has been performed and the pixels 50 on which negative polarity writing has been performed are mixed in one frame, and a flicker may be cancelled between these pixels 50. Thus, it is possible to further suppress deterioration of display quality.

(4) 320 unit control circuits P (P1 to P320) are provided in the control circuit 30 in correspondence with 320 rows of scanning lines Y (Y1 to Y320), and the latch circuit Q and the selection circuit R are provided in each of the unit control circuits P. Thus, it is possible to selectively supply any one of the voltage VCOML and the voltage VCOMH to the common electrode 56 using the control circuit 30.

(5) As a selection voltage is supplied to the scanning line Y that is arranged adjacent to the scanning line Y corresponding to the unit control circuit P, a polarity control signal is held by the latch circuit Q. Thus, polarity control signals are sequentially held in the plurality of unit control circuits P on the basis of selection voltages that are sequentially supplied to the plurality of scanning lines Y by the scanning line driving circuit 10. For this reason, the control circuit 30 does not require a sequential transfer circuit, such as a shift register circuit, in order to sequentially transfer polarity control signals to the plurality of unit control circuits P, so that it is possible to reduce power consumption.

(6) The polarity control signal POL is always taken in by the latch circuits Q1 and Q320, and, when a selection voltage is supplied to at least any one of the adjacent two scanning lines Y, the polarity control signal is taken in by the latch circuits Q2 to Q319. Therefore, not only when the scanning line driving circuit 10 selects the scanning line Y in the order from the scanning line Y1 to the scanning line Y320 but also when the scanning line driving circuit 10 selects the scanning line Y in the order from scanning line Y320 to the scanning line Y1, the control circuit 30 is able to sequentially transfer a polarity control signal to the plurality of unit control circuits P.

(7) The relationship among the voltage VCOMH, the voltage VCOML and the voltages of the polarity control signals POL input to the control terminals (gate terminals) of the first and second transfer gates are set so as to satisfy the relationship such that gate High voltage (high electric potential of the polarity control signal POL)>voltage VCOMH>voltage VCOML>gate Low voltage (low electric potential of the polarity control signal POL). Thus, in the first and second transfer gates, the voltage Vgs between the gate and the source becomes 8 V at the maximum. On the other hand, the voltage Vgs between the gate and source of a circuit element, such as the first clocked inverter 34 of the latch circuit Q, is 12 V at the maximum. Thus, the L length of each of the first and second transfer gates may be set to a value smaller than the L length of each transistor that constitutes the latch circuit Q. Because the L length of each of the first and second transfer gates may be reduced, it is possible to make the first and second transfer gates have a low on resistance and, as a result, it is possible to reduce the occurrence of a crosstalk. In addition, if it is not necessary to reduce the resistance of the circuit, wires may be made thinner by an amount by which the resistance of the circuit is reduced because of the first and second transfer gates are made to have a low on resistance. Thus, it is possible to reduce the area of the circuit. In addition, by reducing the L length, it is also possible to realize a low on resistance and, as a result, it is possible to contribute to low power consumption.

Second Embodiment

Example of COM Separate Driving

Figure 9:
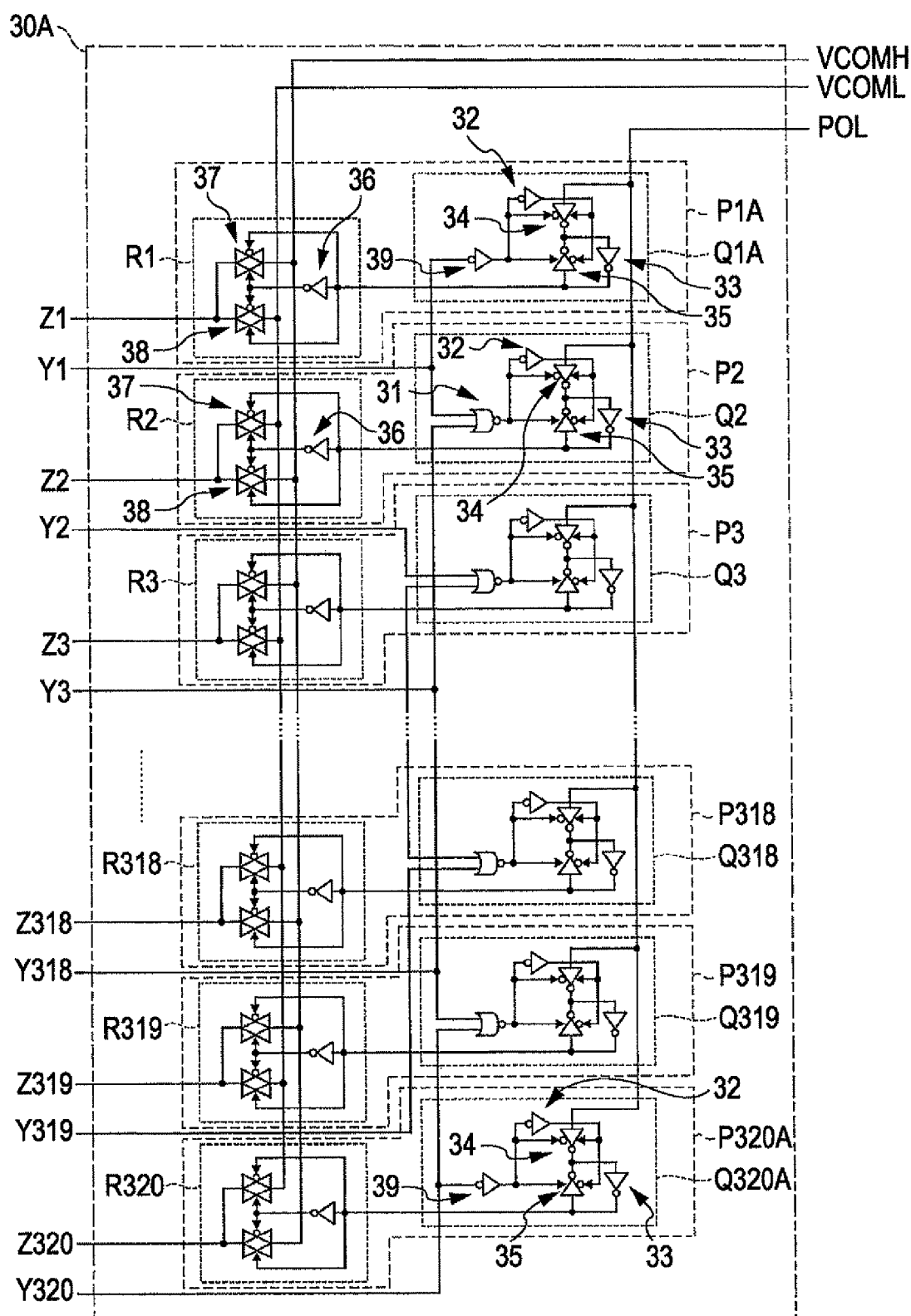
FIG. 9 is a block diagram of a control circuit according to a second embodiment of the invention.

FIG. 9 is a block diagram of a control circuit 30A according to a second embodiment of the invention.

The configuration of a latch circuit Q1A that is provided in correspondence with the first scanning line Y1 and a latch circuit Q320A that is provided in correspondence with the 320th scanning line according to the present embodiment differs from the configuration of the latch circuits Q1 and Q320 according to the first embodiment. The other configuration is the same as that of the first embodiment, and the description thereof will be omitted.

Note that, in place of the selection circuit R, a selection circuit RA may be used. In this case, as in the description of the alternative embodiment to the first embodiment, it is desirable that the second inverter 33 is omitted from the latch circuit Q provided in correspondence with each of the even-numbered scanning lines Y. Then, the polarity control signal POL that is inverted and output from the first clocked inverter 34 is output as it is. Thus, it is possible to alternately output the voltage VCOMH or the voltage VCOML to the common line Z.

The latch circuits Q1A and Q320A each include a first inverter 32, a second inverter 33, a first clocked inverter 34, a second clocked inverter 35 and a third inverter 39.

The input terminal of the third inverter 39 of the latch circuit Q1A is connected to the scanning line Y1, the input terminal of the third inverter 39 of the latch circuit Q320A is connected to the scanning line Y320. The output terminals of these third inverters 39 each are connected to the input terminal of the first inverter 32, the inverting input control terminal of the first clocked inverter 34, and the non-inverting input control terminal of the second clocked inverter 35.

The latch circuit Q1A operates as follows.

That is, as a selection voltage is supplied to the scanning line Y1, the third inverter 39 of the latch circuit Q1A outputs an L level signal. The L level signal is input to the inverting input control terminal of the first clocked inverter 34 and is also inverted by the first inverter 32 and input to the non-inverting input control terminal of the first clocked inverter 34 as an H level signal. Therefore, the first clocked inverter 34 enters an on state to thereby invert and output the polarity control signal POL. The polarity control signal POL that is inverted and output from the first clocked inverter 34 is inverted by the second inverter 33 and output.

In addition, the latch circuit Q320A operates as in the case of the above described latch circuit Q1A (when the selection circuit RA is used, so as to output the polarity control signal POL that is inverted and output from the first clocked inverter 34 as it is) as a selection voltage is supplied to the scanning line Y320.

As described above, as a selection voltage is supplied to the scanning line Y1 by the scanning line driving circuit 10, the latch circuit Q1A takes in the polarity control signal POL. As a selection voltage is supplied to the scanning line Y320 by the scanning line driving circuit 10, the latch circuit Q320A takes in the polarity control signal POL.

Figure 10:
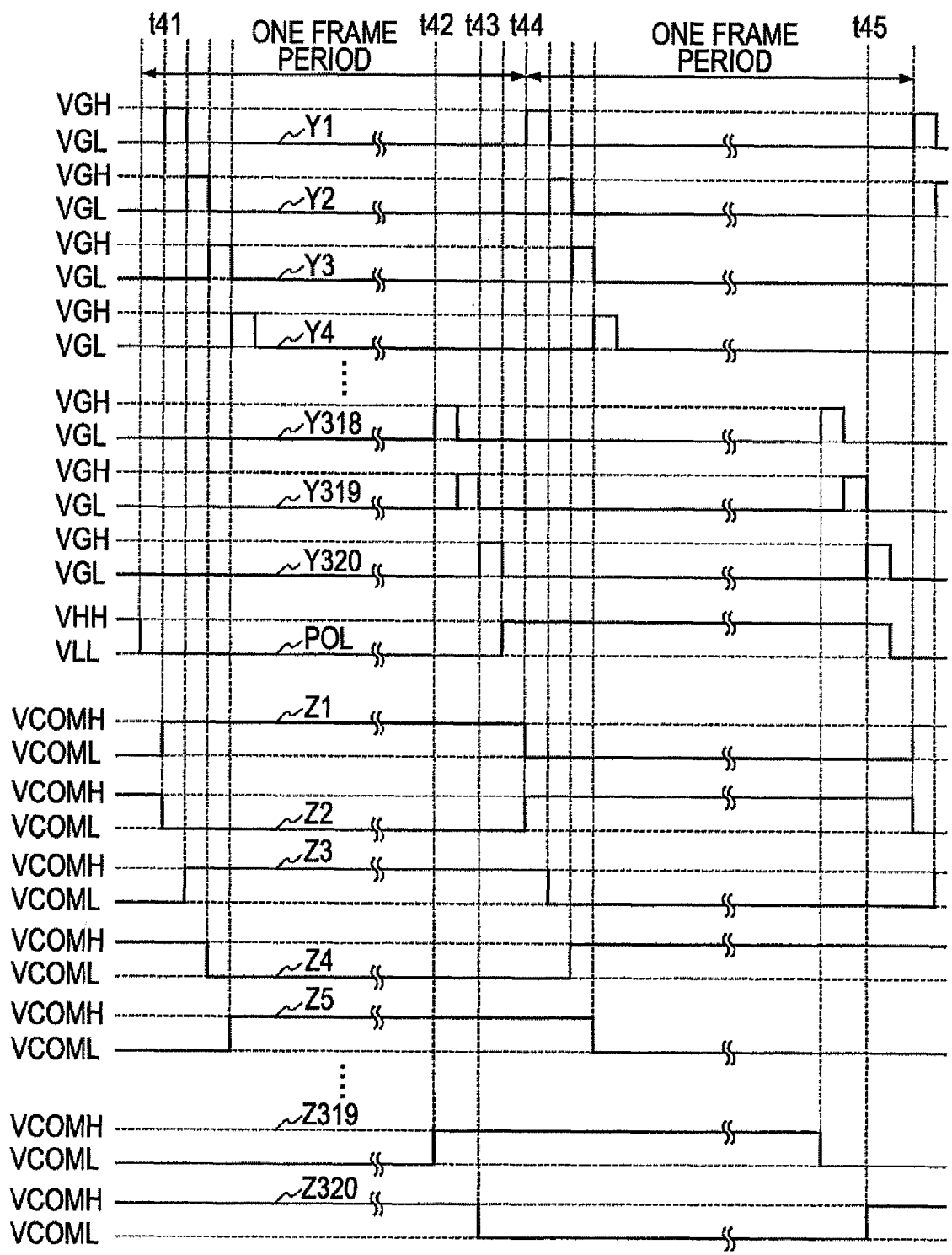
FIG. 10 is a timing chart of the control circuit.

FIG. 10 is a timing chart of the control circuit 30A.

The timing chart of the control circuit 30A shown in FIG. 10 differs in timing, at which the voltages of the common lines Z1 and Z320 change, from the timing chart of the control circuit 30 according to the first embodiment shown in FIG. 6.

The voltage of the common line z1 is inverted at the same time when a selection voltage is supplied from the scanning line driving circuit 10 to the scanning line Y1.

Specifically, at time t41, at the same time when a selection voltage is supplied from the scanning line driving circuit 10 to the scanning line Y1, the unit control circuit P1A takes in the L level polarity control signal POL using the latch circuit Q1A and then outputs the voltage VCOMH using the selection circuit R1. Therefore, the common line Z1 connected to the unit control circuit P1A attains the voltage VCOMH. In addition, at time t44, at the same time when a selection voltage is supplied from the scanning line driving circuit 10 to the scanning line Y1, the unit control circuit P1A takes in the H level polarity control signal POL using the latch circuit Q1A and then outputs the voltage VCOML using the selection circuit R1. Therefore, the common line Z1 connected to the unit control circuit P1A attains the voltage VCOML.

In the meantime, as in the case of the common line Z1, the polarity of the voltage of the common line Z320 is inverted at the same time when a selection voltage is supplied from the scanning line driving circuit 10 to the scanning line Y320.

Specifically, at time t43, at the same time when a selection voltage is supplied from the scanning line driving circuit 10 to the scanning line Y320, the unit control circuit P320A takes in the L level polarity control signal POL using the latch circuit Q320A (when the selection circuit RA is used, takes in the H level polarity control signal POL using the latch circuit Q320A) and then outputs the voltage VCOML using the selection circuit R320. Therefore, the common line Z320 connected to the unit control circuit P320A attains the voltage VCOML.

In addition, at time t44, at the same time when a selection voltage is supplied from the scanning line driving circuit 10 to the scanning line Y320, the unit control circuit P320A takes in the H level polarity control signal POL using the latch circuit Q320A and then outputs the voltage VCOMH using the selection circuit R320. Therefore, the common line Z320 connected to the unit control circuit P320A attains the voltage VCOMH.

According to the present embodiment, the following advantageous effects are obtained.

(8) As shown in FIG. 2, the common electrode 56 is separately provided in units of horizontal line. Therefore, when the voltage of the common electrode 56 varies every adjacent horizontal line, an electric field is generated between these adjacent lines. Thus, there is a possibility that alignment and/or order of the liquid crystal may slightly change. Particularly, in the first embodiment, as shown in FIG. 6, in a period between time t6 and time t7, the voltage of the common line Z319 is the voltage VCOMH, and the voltage of the common line Z320 is the voltage VCOML. Here, the period between time t6 and time t7 corresponds to a period of time that is three times as long as a period of time during which a scanning line Y is being selected by the scanning line driving circuit 10. Therefore, there has been a possibility that, in the period between time t6 and time t7, an electric field may be generated between the common electrode 56 connected to the common line Z319 and the common electrode 56 connected to the common line Z320 and, as a result, alignment and/or order of the liquid crystal may largely change.

Then, at the same time when a selection voltage is supplied to the scanning line Y320, the polarity of the voltage of the common line Z320 is inverted, and a period during which the voltage of the common line Z319 differs from the voltage of the common line Z320 is set to a period between time t42 and time t43. Here, the period between time t42 and time t43 corresponds to a period of time that is twice as long as a period of time during which a scanning line Y is being selected by the scanning line driving circuit 10, so that, in comparison with the first embodiment, a period of time, during which the voltage of the common line Z319 differs from the voltage of the common line Z320, is short. For this reason, in comparison with the first embodiment, it is possible to suppress a change in alignment and/or order of the liquid crystal because of an electric field generated between the common electrode 56 connected to the common line Z319 and the common electrode 56 connected to the common line Z320.

Third Embodiment

Example of COM Separate Driving

Figure 11:
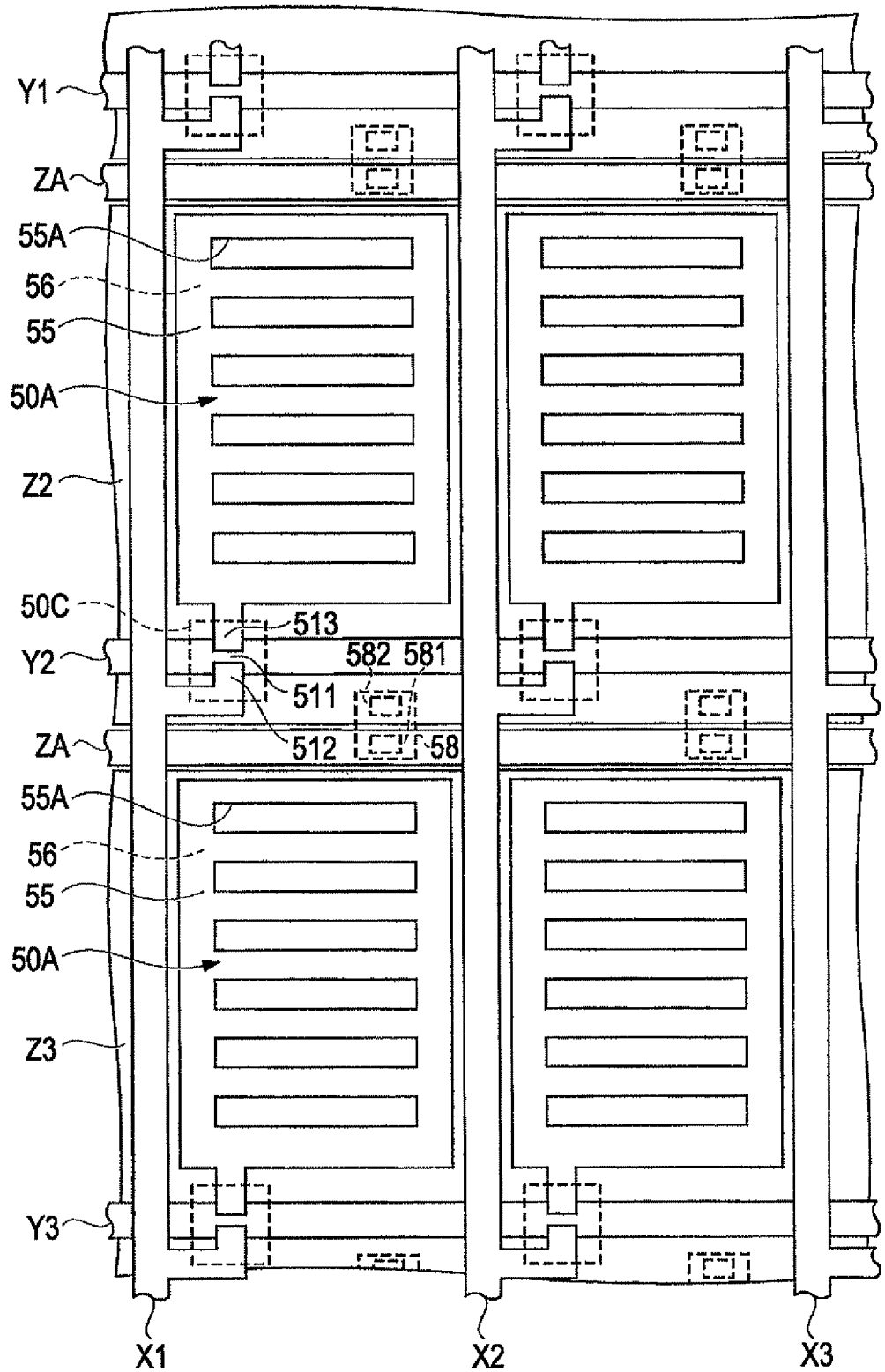
FIG. 11 is an enlarged plan view of pixels according to a third embodiment of the invention.

FIG. 11 is an enlarged plan view of pixels 50A according to a third embodiment of the invention.

The pixels 50A of the present embodiment differ from the pixels 50 of the first embodiment in that each of the pixels 50A has an auxiliary line ZA and a contact portion 58. The other configuration is the same as that of the first embodiment, and the description thereof will be omitted.

Each of the auxiliary lines ZA is formed of a conductive metal and is provided in correspondence with a corresponding one of the common electrodes 56 that are separately provided in units of horizontal line. Each of the auxiliary lines ZA is formed along the scanning line Y.

Each of the contact portions 58 is formed of a conductive metal. Each contact portion 58 is connected to the auxiliary line ZA in a region 581 and is connected to the common electrode 56 and the common line Z in a region 582.

According to the present embodiment, the following advantageous effects are obtained.

(9) The auxiliary line ZA made of a conductive metal is provided in correspondence with a corresponding one of the common electrodes 56 that are separately provided in units of horizontal line, and the common electrode 56 and the common line Z are connected to the auxiliary line ZA through the contact portion 58 made of a conductive metal. Thus, it is possible to reduce the time constant of the common electrode 56 and the time constant of the common line Z.

Fourth Embodiment

Example of SSL Driving

Figure 12:
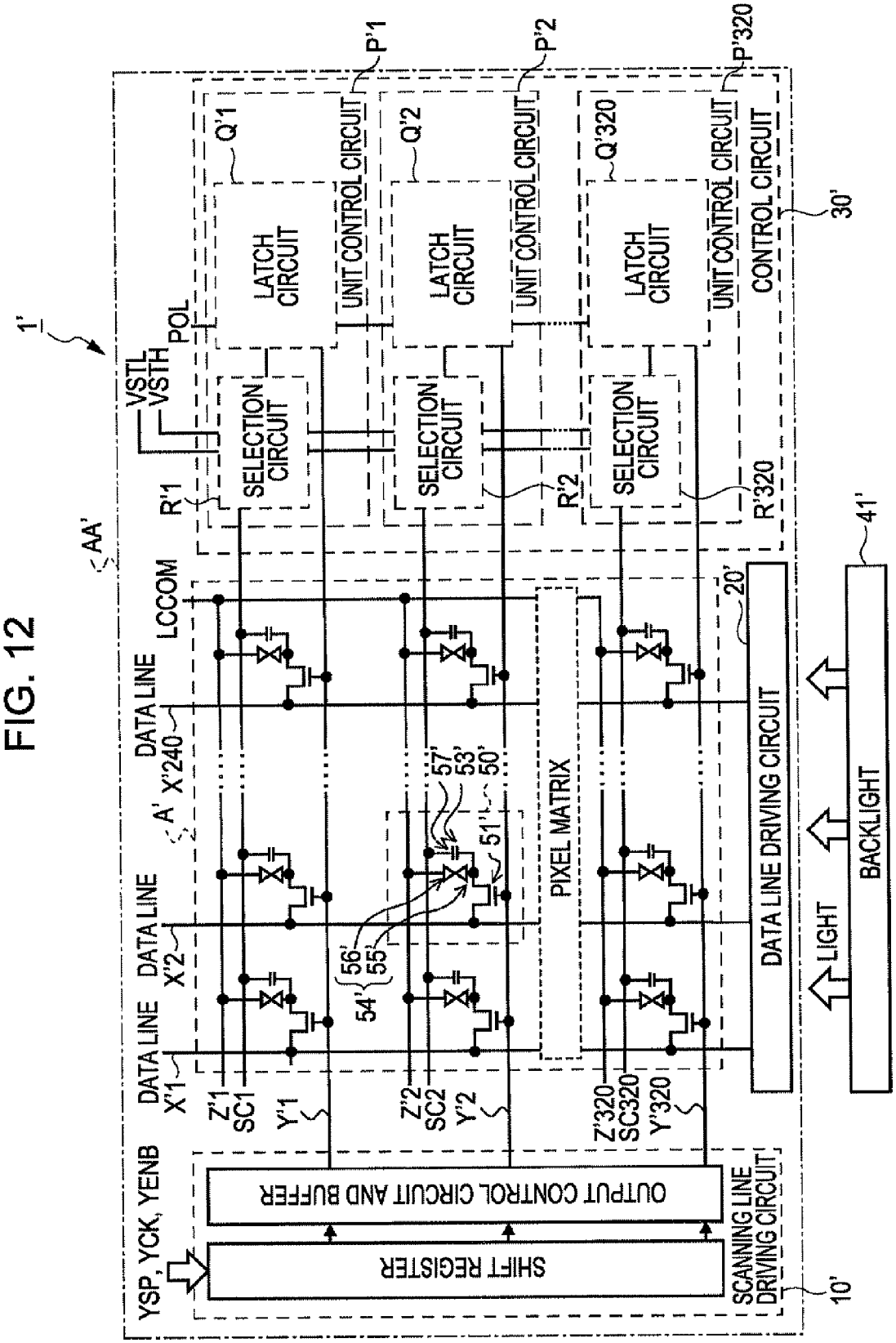
FIG. 12 is a block diagram of a liquid crystal device according to a fourth embodiment of the invention.

FIG. 12 is a block diagram of a vertical electric field mode liquid crystal device 1', which employs SSL driving by which the voltages of capacitor lines are varied, according to a fourth embodiment of the invention.

The liquid crystal device 1' includes a liquid crystal panel AA' and a backlight 41' that is opposed to the liquid crystal panel AA' and that emits light. The liquid crystal device 1' uses light from the backlight 41' to perform transmissive display.

The liquid crystal panel AA' includes a display area A' having a plurality of pixels 50', and also includes a scanning line driving circuit 10', a data line driving circuit 20' and a control circuit 30', which are provided around the display area A' and drive the pixels 50'.

The backlight 41' is provided on the rear face of the liquid crystal panel AA', and is, for example, formed of a cold cathode fluorescent lamp (CCFL), a LED (light emitting diode) or an electroluminescence (EL) and supplies light to the pixels 50' of the liquid crystal panel AA'.

Hereinafter, the configuration of the liquid crystal panel AA' will be described in detail.

The liquid crystal panel AA' includes 320 rows of scanning lines Y' (Y'1 to Y'320) and 320 rows of auxiliary capacitor lines SC (SC1 to SC320) that are alternately provided at predetermined intervals and also includes 240 columns of data lines X' (X'1 to X'240) that are provided so as to intersect with the scanning lines Y' (Y'1 to Y'320) and the auxiliary capacitor lines SC (SC1 to SC320). The pixels 50' are provided at portions corresponding to intersections of the scanning lines Y' and the data lines X'.

Each of the pixels 50' includes a TFT 51', a pixel electrode 55', a common electrode 56', and a storage capacitor 53'. The common electrode 56' is provided opposite the pixel electrode 55'. The storage capacitor 53', which serves as an auxiliary capacitor, of which one electrode (auxiliary capacitor electrode 57') is connected to a corresponding one of the auxiliary capacitor lines SC and the other of which is connected to the pixel electrode 55' or an electrode layer connected to the pixel electrode 55'. The pixel electrode 55' and the common electrode 56' form a pixel capacitor 54'. The liquid crystal panel AA' is formed so that an element substrate, on which various elements, the pixel electrodes 55', and the like, are formed, and an opposite substrate, on which the common electrode 56' is formed, are stuck together via a liquid crystal so that their electrode forming faces are opposite each other.

The common electrode 56' is formed substantially all over the entire opposite substrate. Note that the common electrode 56' may be separately provided in units of horizontal line in correspondence with the scanning line Y'. In this case, a plurality of the common electrodes 56' that are separately provided in units of horizontal line are connected through the common lines Z'.

The gate of the TFT 51' is connected to the scanning line Y', the source of the TFT 51' is connected to the data line X', and the drain of the TFT 51' is connected to the pixel electrode 55' and the other electrode of the storage capacitor 53'. Thus, as a selection voltage is applied from the scanning line Y' to the TFT 51', the TFT 51' enters an on state to thereby attain a conductive state between the data line X' and both the pixel electrode 55' and the other electrode of the storage capacitor 53.

The scanning line driving circuit 10' includes a shift register, an output control circuit and a buffer circuit, and sequentially supplies the plurality of scanning lines Y' with a selection voltage that makes the TFT 51' enter an on state. For example, as a selection voltage is supplied to a scanning line Y', all the TFTs 51' connected to the scanning line Y' enter an on state and, as a result, all the pixels 50' associated with this scanning line Y' are selected.

The data line driving circuit 20' supplies images signals to the data lines X' and writes image voltages based on the image signals to the pixel electrodes 55' through the TFTs 51', which are in an on state.

Here, the data line driving circuit 20' alternately performs positive polarity writing or negative polarity writing in units of horizontal line. In the positive polarity writing, the data line driving circuit 20' supplies the data lines X' with positive polarity image signals of voltages that are higher in electric potential than the voltage of the common electrode 56' to thereby write the pixel electrodes 55' with image voltages based on the positive polarity image signals. In the negative polarity writing, the data line driving circuit 20' supplies the data lines X' with negative polarity image signals of voltages that are lower in electric potential than the voltage of the common electrode 56' to thereby write the pixel electrodes 55' with image voltages based on the negative polarity image signals.

The control circuit 30' alternately supplies the auxiliary capacitor lines SC with a voltage VSTL, which serves as a first voltage, and a voltage VSTH, which serves as a second voltage, that is higher in electric potential than the voltage VSTL.

The control circuit 301 includes 320 unit control circuits P' (P'1 to P'320) in correspondence with 320 rows of the scanning lines Y' (Y'1 to Y'320). Each of the unit control circuits P' is supplied with the voltage VSTL, the voltage VSTH and a polarity control signal POL that selects any one of the voltage VSTL and the voltage VSTH.

Each unit control circuit P' includes a latch circuit Q', which holds the polarity control signal POL, and a selection circuit R', which selectively outputs any one of the voltage VSTL and the voltage VSTH in accordance with the polarity control signal POL.

Figure 13:
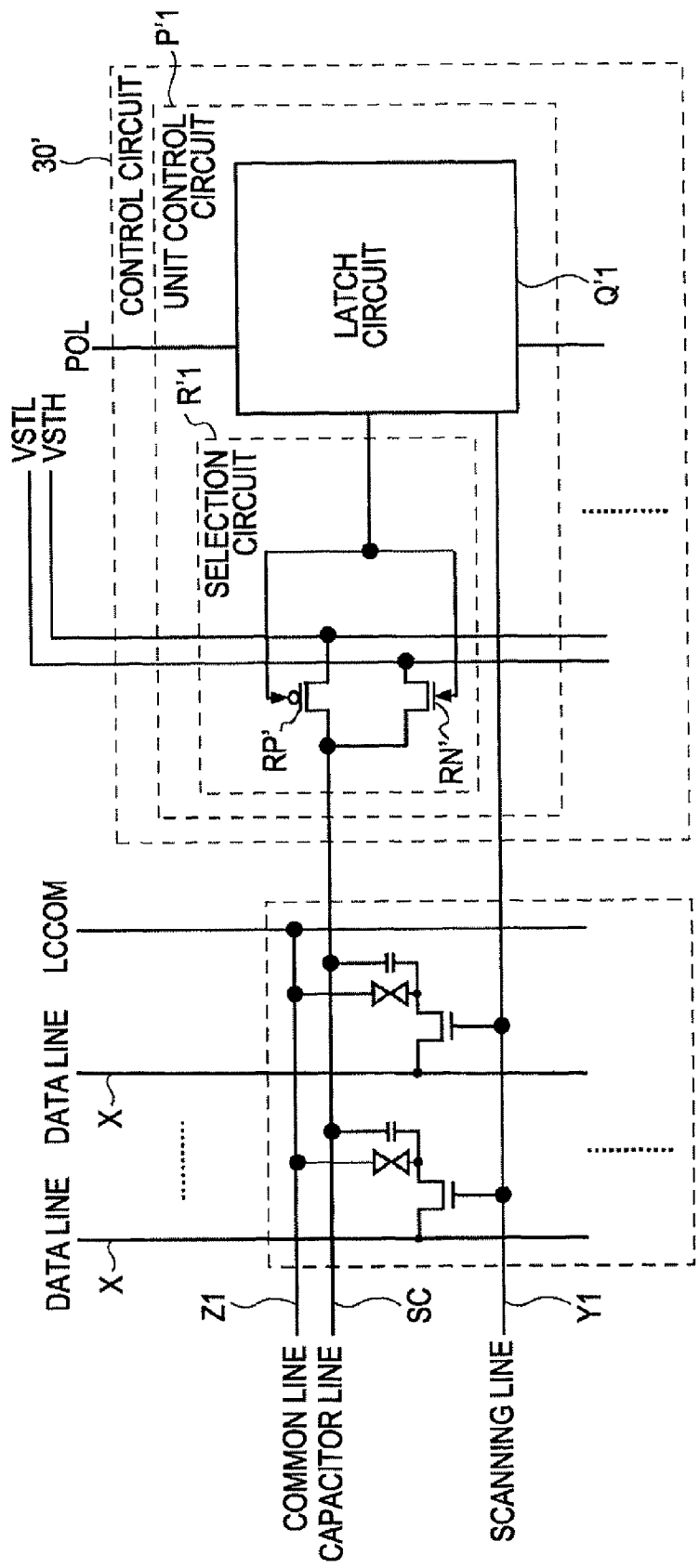
FIG. 13 is a block diagram that shows the configuration of a selection circuit of the liquid crystal device.

FIG. 13 is a block diagram of the circuitry of the selection circuit R', showing an example in which single channel switching transistors are used as switching elements for transfer gates.

The selection circuit R' includes a Pch transfer gate RP', which is formed of a Pch switching transistor, and an Nch transfer gate RN', which is an Nch switching transistor.

The input terminal (source terminal) of the Pch transfer gate RP' is connected to the voltage VSTH. The control terminal (gate terminal) of the Pch transfer gate RP' is connected to the output terminal of the latch circuit Q', and the polarity control signal POL is input to the control terminal of the Pch transfer gate RP'. The output terminal (drain terminal) of the Pch transfer gate RP' is connected to the auxiliary capacitor line SC.

By connecting the voltage VSTH to the input terminal of the Pch transfer gate RP', the voltage VGS between the gate and the source may be increased in comparison with the case in which the voltage VSTH is connected to the input terminal of the Nch transfer gate RN. Thus, it is possible to realize a desirable operation and, in addition, achieve a low on resistance and a decrease in off leakage.

The input terminal (source terminal) of the Nch transfer gate RN' is connected to the voltage VSTL. The control terminal (gate terminal) of the Nch transfer gate RN' is connected to the output terminal of the latch circuit Q', and the polarity control signal POL is input to the control terminal of the Nch transfer gate RN'. The output terminal of the Nch transfer gate RN' is connected to the auxiliary capacitor line SC.

By connecting the voltage VSTL to the input terminal of the Nch transfer gate RN', the voltage VGS between the gate and the source may be increased in comparison with the case in which the Pch transfer gate RP' is used. Thus, it is possible to realize a desirable operation and, in addition, achieve a low on resistance and a decrease in off leakage.

The above described selection circuit R' operates as follows.

That is, as the L level polarity control signal POL is output from the latch circuit Q', this L level polarity control signal POL is input to the control terminal of the Pch transfer gate RP'. Therefore, the Pch transfer gate RP' enters an on state. The Pch transfer gate RP', which is in an on state, outputs the voltage VSTH to the auxiliary capacitor line SC.

On the other hand, as the H level polarity control signal POL is output from the latch circuit Q', this H level polarity control signal POL is input to the control terminal of the Nch transfer gate RN'. Therefore, the Nch transfer gate RN' enters an on state. The Nch transfer gate RN', which is in an on state, outputs the voltage VSTL to the auxiliary capacitor line SC.

In the selection circuit R' described above, by using single channel switching elements as transfer gates, it is possible to reduce the area of a circuit in comparison with the case in which a CMOS switching element is used for the selection circuit R. In addition, the voltage VSTH having a high electric potential is connected to the Pch switching element, the voltage VSTL having a low electric potential is connected to the Nch switching element, and the Pch switching element or the Nch switching element is exclusively made into an on state. Thus, the selection circuit R' may be driven only by a single line control signal, and it is not necessary to use an inverter that is necessary when a CMOS switching element is used, so that it is possible to achieve a further reduction in the area of a circuit.

Note that the relationship among the voltage VSTH, the voltage VSTL and the voltages of the polarity control signals POL input to the control terminals (gate terminals) of the first and second transfer gates are set so as to satisfy the relationship such that gate High voltage (high electric potential of the polarity control signal POL)>voltage VSTH>voltage VSTL>gate Low voltage (low electric potential of the polarity control signal POL).

In the present embodiment, the voltages are, for example, set so that the gate High voltage (high electric potential of the polarity control signal POL) is 8 V that is equal to a high voltage VGH, which will be described later, of the scanning line Y', the gate Low voltage (low electric potential of the polarity control signal POL) is 4 V that is equal to a low voltage VGL, which will be described later, of the scanning line Y', the voltage VSTH is 4 V and the voltage VSTL is 0 V.

Thus, in the first and second transfer gates, the voltage Vgs between the gate and the source becomes 8 V at the maximum. On the other hand, the voltage Vgs between the gate and source of a circuit element, such as the first clocked inverter 34 of the latch circuit Q', is 12 V at the maximum. Thus, the L length of each of the first and second transfer gates may be set to a value smaller than the L length of each transistor that constitutes the latch circuit Q'. In the present embodiment, the L length of each transistor that constitutes the latch circuit Q' needs to be at least 6 µm, while, on the other hand, the L length of each of the first and second transfer gates of the selection circuit R' may be reduced to 4 µm, which is two thirds of the L length of each transistor that constitutes the latch circuit Q'.

Because the L length of each of the first and second transfer gates may be reduced, it is possible to make the first and second transfer gates have a low on resistance and, as a result, it is possible to reduce the occurrence of a crosstalk. In addition, if it is not necessary to reduce the resistance of the circuit, wires may be made thinner by an amount by which the resistance of the circuit is reduced because of the first and second transfer gates are made to have a low on resistance. Thus, it is possible to reduce the area of the circuit. In addition, by reducing the L length, it is also possible to realize a low on resistance and, as a result, it is possible to contribute to low power consumption. In addition, by setting the above described relationship in electric potential, even when single channel switching elements are used for transfer gates, it is possible to achieve an effective low on resistance and a decrease in off leakage of the switching elements.

Furthermore, the relationship among the voltage VSTH, the voltage VSTL and the voltages of the polarity control signals POL applied to the gate terminals of the switching elements as gate electric potentials are set so as to satisfy the relationship such that gate High voltage>voltage VSTH−|threshold value of the Pch transfer gate|>voltage VSTL+|threshold value of the Nch transfer gate|>gate Low voltage. Thus, each of the switching elements may be made into an off state with a voltage that is equal to or lower than a threshold value, so that it is possible to reliably prevent an off leakage.

Note that the voltages are, for example, set so that the gate High voltage (high electric potential of the polarity control signal POL) is 8 V that is equal to a high voltage VGH, which will be described later, the gate Low voltage (low electric potential of the polarity control signal POL) is −4 V that is equal to a low voltage VGL, which will be described later, the voltage VSTH is 4 V and the voltage VSTL is 0 V.

The above described liquid crystal device 1' operates as follows.

Next, by sequentially supplying a selection voltage from the scanning line driving circuit 10, to 320 rows of the scanning lines Y' (Y'1 to Y'320), all the TFTs 51' connected to each of the scanning lines Y' are sequentially made to an on state and, as a result, all the pixels 50 associated with each of the scanning lines Y' are sequentially selected.

Next, in synchronization with the selection of the pixels 50', positive polarity image signals or negative polarity image signals are alternately supplied from the data line driving circuit 20' to the data lines X' in units of horizontal line.

Subsequently, any one of the voltage VSTL and the voltage VSTH is selectively supplied from the control circuit 30' to the auxiliary capacitor lines SC. Specifically, among the 320 rows of the scanning lines Y', when the pixels 50' associated with the selected scanning line Y' are supplied with positive polarity image signals, the auxiliary capacitor line SCp associated with the selected pixels 50' is supplied with the voltage VSTH. On the other hand, among the 320 rows of the scanning lines Y', when the pixels 50' associated with the selected scanning line Y' are supplied with negative polarity image signals, the auxiliary capacitor line SCp associated with the selected pixels 50' is supplied with the voltage VSTL.

That is, in accordance with the polarity of image signals supplied to the pixels 50', any one of the voltage VSTL and the voltage VSTH is selectively supplied from the control circuit 30' to the auxiliary capacitor lines SC.

Each of the auxiliary capacitor lines SC is alternately supplied with the voltage VSTL or the voltage VSTH every one frame period. For example, in a one frame period, when a p-th auxiliary capacitor line SCp (p is an integer that satisfies $1 \leq p \leq 320$) is supplied with the voltage VSTL, the auxiliary capacitor line SCp is supplied with the voltage VSTH in the next one frame period. On the other hand, in a one frame period, when the auxiliary capacitor line SCp is supplied with the voltage VSTH, the auxiliary capacitor line SCp is supplied with the voltage VSTL in the next one frame period.

In addition, different voltages are supplied to the adjacent auxiliary capacitor lines SC. For example, in a one frame period, when the auxiliary capacitor line SCp is supplied with the voltage VSTL, a (p−1)th auxiliary capacitor line SC(p−1) and a (p+1)th auxiliary capacitor line SC(p+1) are supplied with the voltage VSTH in the same one frame period. On the other hand, in a one frame period, the auxiliary capacitor line SCp is supplied with the voltage VSTH, the (p−1)th auxiliary capacitor line SC(p−1) and the (p+1)th auxiliary capacitor line SC(p+1) are supplied with the voltage VSTL in the same one frame period.

In this manner, after a positive polarity image voltage is written to each of the pixel electrodes 551, the voltage of the auxiliary capacitor line SC is increased. Therefore, the voltage of each pixel electrode 55' is increased by an amount that is obtained by adding a voltage increased by a positive polarity image voltage and a voltage increased by electric charge corresponding to an amount by which the voltage of the auxiliary capacitor line SC is increased.

On the other hand, after a negative polarity image voltage is written to each of the pixel electrodes 55', the voltage of the auxiliary capacitor line SC is decreased. Therefore, the voltage of each pixel electrode is decreased by an amount that is obtained by adding a voltage decreased by a negative polarity image voltage and a voltage decreased by electric charge corresponding to an amount by which the voltage of the auxiliary capacitor line SC is decreased.

Thus, by varying the voltage of the auxiliary capacitor line SC, it is possible to increase the amplitude of a driving voltage applied to the liquid crystal by varying the voltage of the pixel electrode 55, using the voltage of the common electrode 56' as a reference. Accordingly, even when the amplitude of an image voltage is decreased, it is possible to ensure the amplitude of a driving voltage applied to the liquid crystal. Thus, by decreasing the amplitude of an image voltage, it is possible to reduce power consumption.

The operation of the driving voltage will be described with reference to FIG. 14 and FIG. 15.

FIG. 14 is a timing chart when the liquid crystal device according to the fourth embodiment performs positive polarity writing. FIG. 15 is a timing chart when the liquid crystal device according to the fourth embodiment performs negative polarity writing.

In FIG. 14 and FIG. 15, GATE(m) represents a voltage of the m-th scanning line Y' (m is an integer that satisfies $1 \leq m \leq 320$) among the 320 rows of the scanning lines Y', and VST(m) represents a voltage of the m-th auxiliary capacitor line SC among 320 rows of the auxiliary capacitor lines SC. In addition, SOURCE(n) represents a voltage of the n-th data line X' (n is an integer that satisfies $1 \leq n \leq 240$) among 240 columns of the data lines X'. In addition, PIX(m, n) represents a voltage of the pixel electrode of the m-th row and n-th column pixel that is provided at a position corresponding to the intersection of the m-th scanning line Y' and the n-th data line X', and VST(m) represents a voltage of the common electrode 56 of the m-th row and n-th column pixel.

First, the case when the liquid crystal device performs positive polarity writing will be described with reference to FIG. 14.

At time t51, the scanning line driving circuit 10' supplies the m-th scanning line Y' with a selection voltage. Then, the voltage GATE(m) of the m-th scanning line Y' increases and, at time t52, becomes the voltage VGH. In this manner, all the TFTs connected to the m-th scanning line enter an on state.

At time t53, the data line driving circuit 20' supplies the n-th data line X' with a positive polarity image signal. Then, the voltage SOURCE(n) of the n-th data line X' gradually increases and, at time t54, becomes a voltage VP8.

The voltage SOURCE(n) of the n-th data line X' is written to the pixel electrode 55' of the m-th row and n-th column pixel through the TFT 51', which is in an on state, that is connected to the m-th scanning line Y' as an image voltage based on the positive polarity image signal. Therefore, the voltage PIX(m, n) of the pixel electrode 55' of the m-th row and n-th column pixel 50' gradually increases and, at time t54, becomes the voltage VP8, which has the same electric potential as the voltage SOURCE(n) of the n-th data line X'.

At time t55, the scanning line driving circuit 10' stops supplying a selection voltage to the m-th scanning line Y'. Then, the voltage GATE(m) of the m-th scanning line Y' decreases and, at time t56, becomes the voltage VGL. In this manner, all the TFTs 51' connected to the m-th scanning line Y' enter an off state.

At the same time, the control circuit 30' supplies the m-th auxiliary capacitor line SC with a voltage that increases the voltage of the auxiliary capacitor line SC. Then, the voltage VST(m) of the m-th auxiliary capacitor line SC gradually increases and, at time t57, becomes the voltage VSTH.

As the voltage VST(m) of the m-th auxiliary capacitor line SC increases, electric charge corresponding to the above increase is distributed between the storage capacitor 53' and the pixel capacitor 54' in each of the pixels 50' associated with the m-th auxiliary capacitor line SC. Therefore, the voltage PIX(m, n) of the pixel electrode 55' of the m-th row and n-th column pixel 50' gradually increases and, at time t57, becomes a voltage VP9.

Next, the case when the liquid crystal device performs negative polarity writing will be described with reference to FIG. 15.

At time t61, the scanning line driving circuit 10' supplies the m-th scanning line Y' with a selection voltage. Then, the voltage GATE(m) of the m-th scanning line Y' increases and, at time t62, becomes the voltage VGH. In this manner, all the TFTs connected to the m-th scanning line Y' enter an on state.

At time t63, the data line driving circuit 20' supplies the n-th data line X' with a negative polarity image signal. Then, the voltage SOURCE(n) of the n-th data line X' gradually decreases and, at time t64, becomes a voltage VP11.

The voltage SOURCE(n) of the n-th data line X' is written to the pixel electrode 55' of the m-th row and n-th column pixel 50' through the TFT, which is in an on state, that is connected to the m-th scanning line Y' as an image voltage based on the negative polarity image signal. Therefore, the voltage PIX(m, n) of the pixel electrode 55' of the m-th row and n-th column pixel 501 gradually decreases and, at time t64, becomes the voltage VP11, which has the same electric potential as the voltage SOURCE(n) of the n-th data line X'.

At time t65, the scanning line driving circuit 10' stops supplying a selection voltage to the m-th scanning line Y'. Then, the voltage GATE(m) of the m-th scanning line Y' decreases and, at time t66, becomes the voltage VGL. In this manner, all the TFTs connected to the m-th scanning line Y' enter an off state.

At the same time, the control circuit 30' supplies the m-th auxiliary capacitor line SC with a voltage that decreases the voltage of the auxiliary capacitor line SC. Then, the voltage VST(m) of the m-th auxiliary capacitor line SC gradually decreases and, at time t67, becomes the voltage VSTL.

As the voltage VST(m) of the m-th auxiliary capacitor line SC decreases, electric charge corresponding to the above decrease is distributed between the storage capacitor 53' and the pixel capacitor 54' in each of the pixels 50' associated with the m-th auxiliary capacitor line SC. Therefore, the voltage PIX(m, n) of the pixel electrode 55' of the m-th row and n-th column pixel 50' gradually decreases and, at time t67, becomes a voltage VP10.

Alternative Embodiments

Note that the aspects of the invention are not limited to the above described embodiments, but they may be modified into various forms within the scope of the invention.

For example, in the above described embodiments, 320 rows of scanning lines Y and 240 columns of data lines X are provided; however, the number of scanning lines and/or the number of data lines are not limited to them. For example, 480 rows of scanning lines Y and 640 columns of data lines X may be provided.

In addition, in the above described embodiments, the displays are configured to perform transmissive display; however, the display mode is not limited to it. For example, transflective display that provides both transmissive display that uses light from the backlight 41 and reflective display that uses reflected light of ambient light may be performed.

In addition, in the above described embodiments, the TFT 51 formed of low-temperature polysilicon is provided as a TFT; however, the TFT is not limited to it. For example, a TFT formed of amorphous silicon may be provided.

In addition, in the above described embodiments, the second insulating film 64 is formed on the common electrode(s) 56, and the pixel electrodes 55 are formed on the second insulating film 64; however, it is not limited. For example, the second insulating film 64 may be formed on the pixel electrodes 55, and the common electrode(s) 56 may be formed on the second insulating film 64.

In addition, in the above described embodiments, the liquid crystal operates in an FFS mode; however, the operation mode of the liquid crystal is not limited to it. For example, the liquid crystal may operate in an IPS mode.

In addition, in the above described embodiments, the common electrode 56 is separately provided in units of horizontal line; however, it is not limited. For example, the common electrode 56 may be separately provided in units of two horizontal lines or in units of three horizontal lines.

Here, for example, when the common electrode 56 is separately provided in units of two horizontal lines, the control circuit 30 alternately supplies the voltage VCOML or the voltage VCOMH to every pair of two common lines Z connected to each of the common electrodes 56. Furthermore, the data line driving circuit 20 alternately performs positive polarity writing or negative polarity writing in units of two horizontal lines corresponding to each of the common electrode 56.

Application Example

Figure 16:
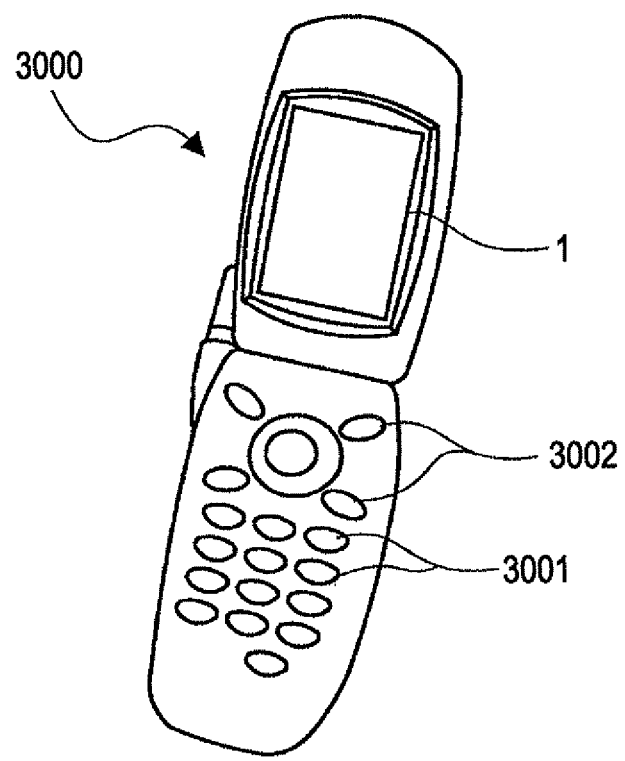
FIG. 16 is a perspective view that shows the configuration of a cellular phone to which the above described liquid crystal device is applied.

Next, an electronic apparatus to which the liquid crystal device 1 according to the above described first embodiment is applied will be described. FIG. 16 is a perspective view that shows the configuration of a cellular phone to which the liquid crystal device 1 is applied. The cellular phone 3000, which serves as an electronic apparatus, includes a plurality of operation buttons 3001, a plurality of scroll buttons 3002, and the liquid crystal device 1. By operating the scroll buttons 3002, an image displayed on the liquid crystal device 1 is scrolled.

Note that the electronic apparatus that uses the liquid crystal device 1 includes, in addition to the apparatus shown in FIG. 16, a personal computer, a personal digital assistants, a digital still camera, a liquid crystal display television, a viewfinder type or a direct view type video tape recorder, a car navigation system, a pager, a personal organizer, an electronic calculator, a word processor, a workstation, a video telephone, a POS terminal, and devices provided with a touch panel display. Then, as a display portion for these various electronic apparatuses, the above described liquid crystal device may be applied.

What is claimed is:

1. A liquid crystal device comprising:
   a plurality of scanning lines;
   a plurality of data lines that intersect with the scanning lines;
   a plurality of pixel electrodes that are provided at positions corresponding to intersections of the plurality of scanning lines and the plurality of data lines;
   a capacitor electrode that is provided opposite each of the pixel electrodes and that forms a capacitor with each of the pixel electrodes or with an electrode layer connected to each of the pixel electrodes;
   a control circuit that alternately supplies the capacitor electrode with a first voltage or a second voltage that is higher in electric potential than the first voltage, the control circuit including transistors;
   a scanning line driving circuit that sequentially supplies the plurality of scanning lines with a scanning line selection voltage that selects the scanning line; and a data line driving circuit that, when the scanning line is selected, alternately supplies the plurality of data lines with a positive polarity image signal that is higher in electric potential than the first voltage or a negative polarity image signal that is lower in electric potential than the second voltage, wherein the control circuit includes a selection circuit and a selection signal output circuit, wherein the selection circuit alternately selects and outputs the first voltage or the second voltage to the capacitor electrode, wherein the selection signal output circuit outputs a selection signal to the selection circuit, wherein the first voltage is higher in electric potential than a low electric potential of the selection signal, and the second voltage is lower in electric potential than a high electric potential of the selection signal, wherein a difference in electric potential between a gate and a source of each transistor that constitutes the selection circuit is set lower than a difference in electric potential between a gate and a source of each transistor that constitutes the selection signal output circuit, and wherein a gate length of each transistor that constitutes the selection circuit is set shorter than the gate length of each transistor that constitutes the selection signal output circuit to reduce an amount of crosstalk between the plurality of data lines and the capacitor electrode.

2. The liquid crystal device according to claim 1, further comprising:
a pair of substrates that hold a liquid crystal, wherein
the transistors of the control circuit are formed on any one of the substrates.

3. The liquid crystal device according to claim 1, wherein the capacitor electrode is a common electrode.

4. The liquid crystal device according to claim 3, further comprising:
a first substrate that includes the plurality of scanning lines, the plurality of data lines, the plurality of pixel electrodes that are provided at positions corresponding to intersections of the plurality of scanning lines and the plurality of data lines, and the opposite electrode provided opposite the pixel electrodes;
a second substrate that is opposed to the first substrate; and
a liquid crystal that is provided between the first substrate and the second substrate, wherein
after the control circuit supplies the first voltage to the common electrode, the scanning line driving circuit supplies the selection voltage to the scanning line and the data line driving circuit supplies the positive polarity image signals to the data lines,
while, after the control circuit supplies the second voltage to the common electrode, the scanning line driving circuit supplies the selection voltage to the scanning line and the data line driving circuit supplies the negative polarity image signals to the data lines.

5. An electronic apparatus comprising the liquid crystal device according to claim 1.

6. The liquid crystal device according to claim 1, wherein the gate length of each transistor that constitutes the selection circuit is 4 micrometers and the gate length of each transistor that constitutes the selection signal output circuit is 6 micrometers.

7. The liquid crystal device according to claim 1, wherein the gate of each transistor that constitutes the selection circuit has a low on resistance based on the gate length of each transistor that constitutes the selection circuit being set shorter than the gate length of each transistor that constitutes the selection signal output circuit.

8. The liquid crystal device according to claim 7, wherein wires connecting the capacitor electrode to the selection circuit have a width that corresponds to the on resistance.

9. The liquid crystal device according to claim 1, wherein the selection signal output circuit is a latch circuit that includes:
a NOR circuit that applies a NOT-OR function to the scanning line selection voltage received from at least two of the plurality of scanning lines;
a first inverter connected to an output of the NOR circuit;
a first clocked inverter that receives the selection signal, the first clocked inverter being controlled by the output from the NOR circuit and an output from the first inverter;
a second inverter connected to an output from the first clocked inverter; and
a second clocked inverter connected to an output from the second inverter, an output from the second clocked inverter being connected to the second inverter and the selection circuit.

10. The liquid crystal device according to claim 9, wherein the latch circuit is to hold the selection signal until the scanning line driving circuit changes which of the plurality of scanning lines receives the scanning line selection voltage.

11. A liquid crystal device comprising:
a plurality of scanning lines;
a plurality of data lines that intersect with the scanning lines;
a plurality of pixel electrodes that are provided at positions corresponding to intersections of the plurality of scanning lines and the plurality of data lines;
a capacitor electrode that is provided opposite each of the pixel electrodes and that forms a capacitor with each of the pixel electrodes or with an electrode layer connected to each of the pixel electrodes;
a control circuit that alternately supplies the capacitor electrode with a first voltage or a second voltage that is higher in electric potential than the first voltage, the control circuit including transistors;
a scanning line driving circuit that sequentially supplies the plurality of scanning lines with a scanning line selection voltage that selects the scanning line; and
a data line driving circuit that, when the scanning line is selected, alternately supplies the plurality of data lines with a positive polarity image signal that is higher in electric potential than the first voltage or a negative polarity image signal that is lower in electric potential than the second voltage, wherein the control circuit includes a selection circuit and a selection signal output circuit, wherein the selection circuit alternately selects and outputs the first voltage or the second voltage to the capacitor electrode, wherein the selection signal output circuit outputs a selection signal to the selection circuit, wherein the first voltage is higher in electric potential than a low electric potential of the selection signal, and the second voltage is lower in electric potential than a high electric potential of the selection signal, wherein a difference in electric potential between a gate and a source of each transistor that constitutes the selection circuit is set lower than a difference in electric potential between a gate and a source of each transistor that constitutes the selection signal output circuit, and wherein the gate length of each transistor that constitutes the selection circuit is 4 micrometers and the gate length of each transistor that constitutes the selection signal output circuit is 6 micrometers.

12. A liquid crystal device comprising:
a plurality of scanning lines;
a plurality of data lines that intersect with the scanning lines;
a plurality of pixel electrodes that are provided at positions corresponding to intersections of the plurality of scanning lines and the plurality of data lines;
a capacitor electrode that is provided opposite each of the pixel electrodes and that forms a capacitor with each of the pixel electrodes or with an electrode layer connected to each of the pixel electrodes;
a control circuit that alternately supplies the capacitor electrode with a first voltage or a second voltage that is higher in electric potential than the first voltage, the control circuit including transistors;
a scanning line driving circuit that sequentially supplies the plurality of scanning lines with a scanning line selection voltage that selects the scanning line; and
a data line driving circuit that, when the scanning line is selected, alternately supplies the plurality of data lines with a positive polarity image signal that is higher in electric potential than the first voltage or a negative polarity image signal that is lower in electric potential than the second voltage, wherein
the control circuit includes a selection circuit and a selection signal output circuit, wherein
the selection circuit alternately selects and outputs the first voltage or the second voltage to the capacitor electrode, wherein
the selection signal output circuit outputs a selection signal to the selection circuit, wherein
the first voltage is higher in electric potential than a low electric potential of the selection signal, and the second voltage is lower in electric potential than a high electric potential of the selection signal, wherein
a difference in electric potential between a gate and a source of each transistor that constitutes the selection circuit is set lower than a difference in electric potential between a gate and a source of each transistor that constitutes the selection signal output circuit, and wherein
the gate of each transistor that constitutes the selection circuit has a low on resistance based on the gate length of each transistor that constitutes the selection circuit being set shorter than the gate length of each transistor that constitutes the selection signal output circuit.

13. The liquid crystal device according to claim 12, wherein wires connecting the capacitor electrode to the selection circuit have a width that corresponds to the on resistance.

14. A liquid crystal device comprising:
a plurality of scanning lines;
a plurality of data lines that intersect with the scanning lines;
a plurality of pixel electrodes that are provided at positions corresponding to intersections of the plurality of scanning lines and the plurality of data lines;
a capacitor electrode that is provided opposite each of the pixel electrodes and that forms a capacitor with each of the pixel electrodes or with an electrode layer connected to each of the pixel electrodes;
a control circuit that alternately supplies the capacitor electrode with a first voltage or a second voltage that is higher in electric potential than the first voltage, the control circuit including transistors;
a scanning line driving circuit that sequentially supplies the plurality of scanning lines with a scanning line selection voltage that selects the scanning line; and
a data line driving circuit that, when the scanning line is selected, alternately supplies the plurality of data lines with a positive polarity image signal that is higher in electric potential than the first voltage or a negative polarity image signal that is lower in electric potential than the second voltage, wherein
the control circuit includes a selection circuit and a selection signal output circuit, wherein
the selection circuit alternately selects and outputs the first voltage or the second voltage to the capacitor electrode, wherein
the selection signal output circuit outputs a selection signal to the selection circuit, wherein
the first voltage is higher in electric potential than a low electric potential of the selection signal, and the second voltage is lower in electric potential than a high electric potential of the selection signal, wherein
a difference in electric potential between a gate and a source of each transistor that constitutes the selection circuit is set lower than a difference in electric potential between a gate and a source of each transistor that constitutes the selection signal output circuit, and wherein
the selection signal output circuit is a latch circuit that includes:
  a NOR circuit that applies a NOT-OR function to the scanning line selection voltage received from at least two of the plurality of scanning lines,
  a first inverter connected to an output of the NOR circuit,
  a first clocked inverter that receives the selection signal, the first clocked inverter being controlled by the output from the NOR circuit and an output from the first inverter,
  a second inverter connected to an output from the first clocked inverter, and
  a second clocked inverter connected to an output from the second inverter, an output from the second clocked inverter being connected to the second inverter and the selection circuit.

15. The liquid crystal device according to claim 14, wherein the latch circuit is to hold the selection signal until the scanning line driving circuit changes which of the plurality of scanning lines receives the scanning line selection voltage.

* * * * *